EXTENSIBLE STRUCTURE

Filed March 22, 1967 9 Sheets-Sheet 1

INVENTORS.
HARRY S. GREENBERG
GEORGE W. MORGAN
BY
Richard D. Seidel
ATTORNEY

EXTENSIBLE STRUCTURE

Filed March 22, 1967 9 Sheets-Sheet 2

INVENTORS.
HARRY S. GREENBERG
GEORGE W. MORGAN
BY Richard D. Seibel
ATTORNEY

INVENTORS.
HARRY S. GREENBERG
GEORGE W. MORGAN
BY Richard D. Seibel
ATTORNEY

INVENTORS
HARRY S. GREENBERG
GEORGE W. MORGAN
BY Richard D. Seidel
ATTORNEY

INVENTORS.
HARRY S. GREENBERG
GEORGE W. MORGAN
BY Richard D. Seibel
ATTORNEY

Feb. 24, 1970 H. S. GREENBERG ET AL 3,496,687

EXTENSIBLE STRUCTURE

Filed March 22, 1967 9 Sheets-Sheet 6

INVENTORS.
HARRY S. GREENBERG
GEORGE W. MORGAN
BY Richard D. Seibel
ATTORNEY

Feb. 24, 1970 H. S. GREENBERG ETAL 3,496,687

EXTENSIBLE STRUCTURE

Filed March 22, 1967 9 Sheets-Sheet 7

INVENTORS.
HARRY S. GREENBERG
GEORGE W. MORGAN
BY Richard D. Seidel
ATTORNEY

EXTENSIBLE STRUCTURE

Filed March 22, 1967 9 Sheets-Sheet 8

INVENTORS.
HARRY S. GREENBERG
GEORGE W. MORGAN
BY Richard D. Seibel
ATTORNEY

EXTENSIBLE STRUCTURE

Filed March 22, 1967 9 Sheets-Sheet 9

INVENTORS.
HARRY S. GREENBERG
GEORGE W. MORGAN
BY
Richard D. Seibel
ATTORNEY

United States Patent Office 3,496,687
Patented Feb. 24, 1970

3,496,687
EXTENSIBLE STRUCTURE
Harry S. Greenberg, Tustin, and George W. Morgan, Anaheim, Calif., assignors to North American Rockwell Corporation, a corporation of Delaware
Filed Mar. 22, 1967, Ser. No. 625,114
Int. Cl. E04b *1/32;* E04h *12/18*
U.S. Cl. 52—109 26 Claims

ABSTRACT OF THE DISCLOSURE

A lazy tongs type extensible boom is provided having a zigzag cable along the length thereof for providing a substantially uniform opening force on each scissoring element thereof. The scissoring links of the boom are of unequal proportions so that a non-linear extension of the boom is obtained in either a circular arc or a non-circular path. In one embodiment six of such booms are combined with intercostal bracing cables to form an extensible structural framework on which a reflective membrane is supported to form an extensible mirror or antenna. Various cable and bar type bracing arrangements are provided in other embodiments of linear and non-linear extensible booms for providing rigidity after extension.

Background

In many situations it is desirable to employ a light weight extensible structure which can be retracted for storage or transportation. Thus, for example, it may be desirable to provide a bridge that is readily transported and erected. Such a bridge is useful in military operations and emergency rescue work and may comprise one or more long truss like support members and flooring to complete the bridge. The long trusses are preferably foldable and readily deployed in the field with a minimum of tools and, for ease of transport, are preferably packed into very small volumes when retracted. The use of light weight extensible structures is also highly desirable in numerous space operations in view of launch vehicle payload weight limitations. Compact packaging of the structure is also desired to minimize aerodynamic heating and buffeting imposed on the payload and launch vehicle.

It is therefore desirable to provide a light weight foldable structure that is readily extended into a large structure automatically. The extensible structure may be straight for gravity gradient stabilized satellites or for bridges, for example, or may be curved and combined with similar structures for shelter roofs, or large antennas, for example. In any event, the extensible structure is preferably capable of carrying compression, torsion, and bending loads as well as tension loads.

Brief summary of the invention

According to a preferred embodiment there is provided an extensible structure of the lazy tongs type including a zigzag cable along the length of the structure for extending the structure. Cables or foldable links may be provided for limiting extension. The links forming the lazy tongs may be made non-symmetrical so that the structure extends in a circular path or in a non-circular curved path. A plurality of extensible lazy tongs booms are combined in a preferred embodiment with cables to form an extensible structural network which may be used as an antenna.

It is therefore a broad object of this invention to provide an improved extensible structure.

Other objects and many attendant advantages of this invention will be appreciated as the same becomes better understood by reference to the following detailed description when considered in connection with the accompanying drawings wherein.

Figure 1:
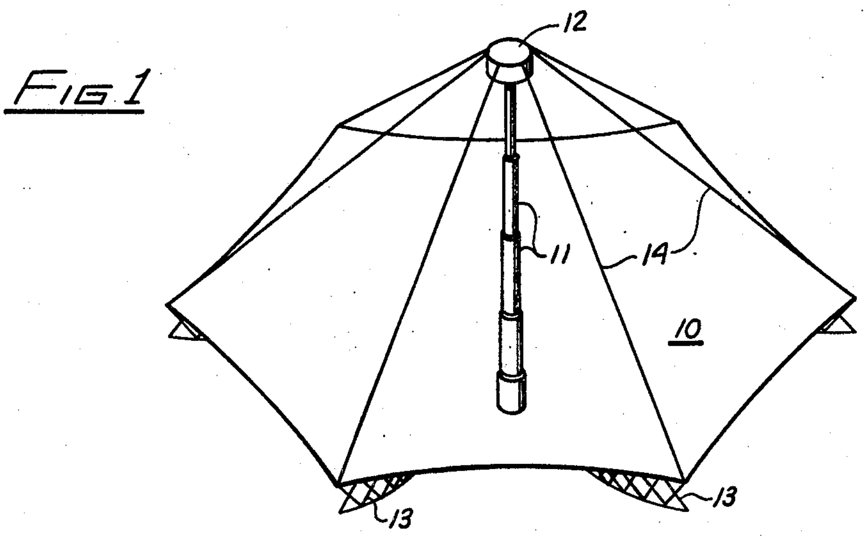
FIG. 1 illustrates a perspective view of an extensible antenna constructed according to the principles of this invention.
Figure 29:
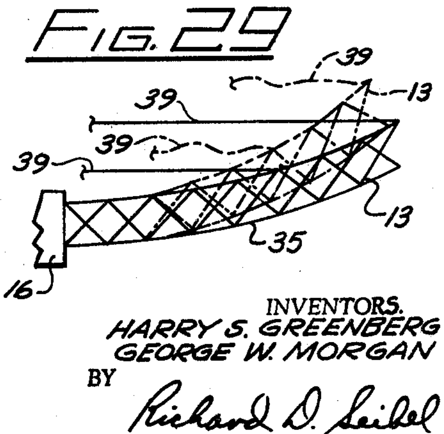
Figures 4, 12, 13:
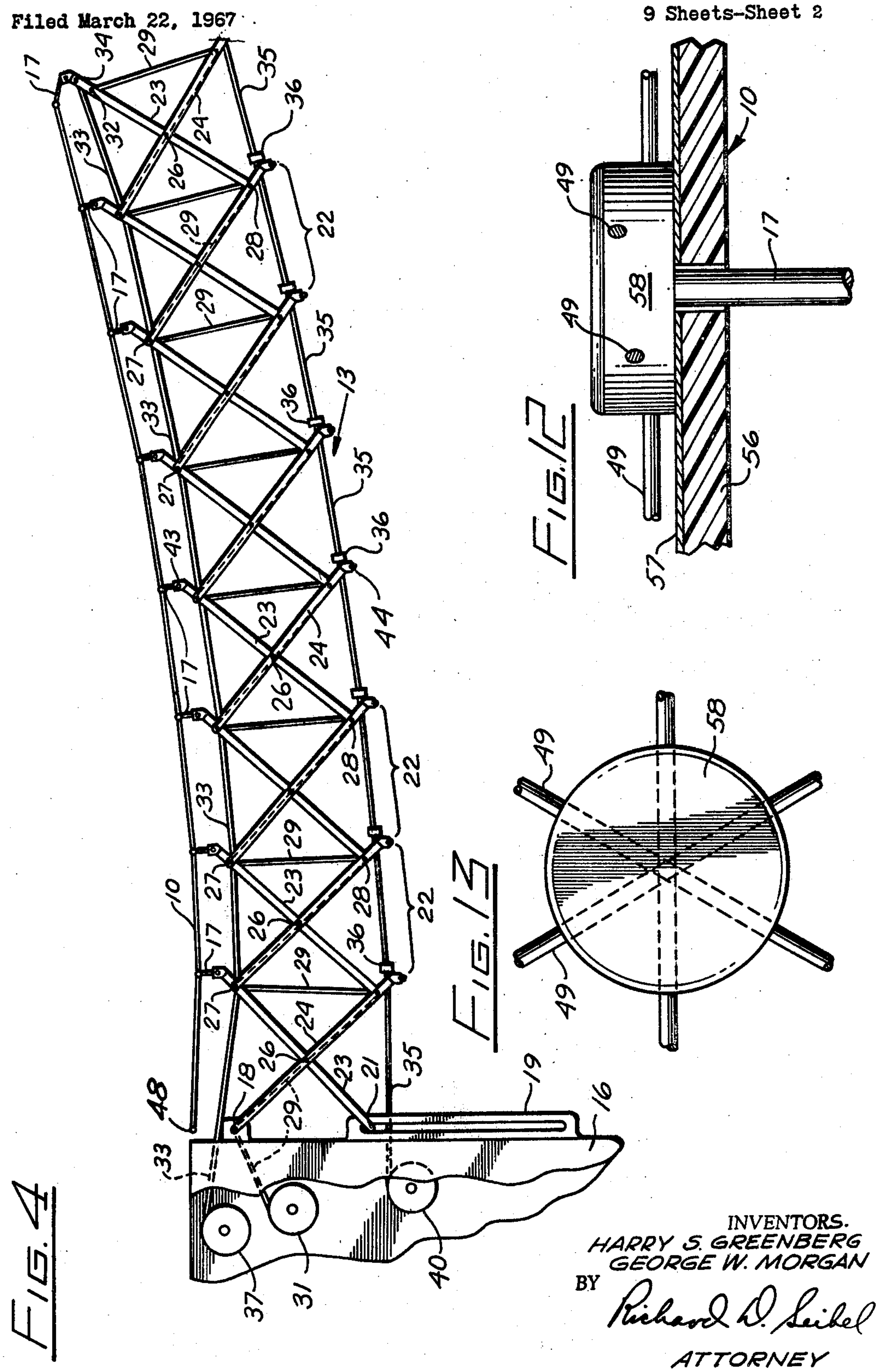
FIG. 4 is a side view of one boom of the antenna of FIG. 1 illustrating a typical extensible structure.
Figure 5:
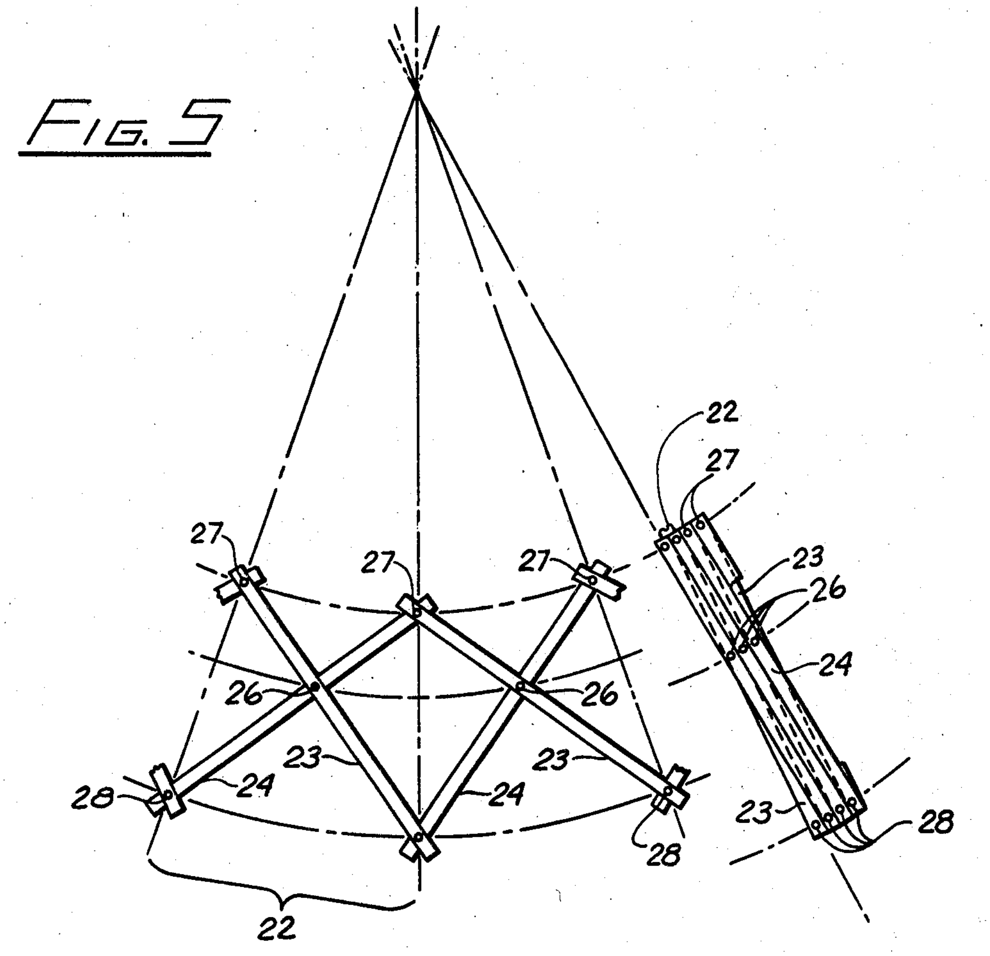
Figure 14:
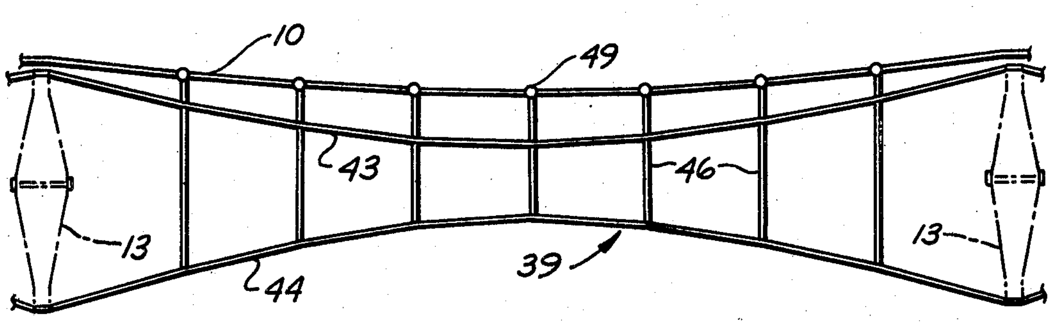
Figures 6, 7, 8, 9, 10:
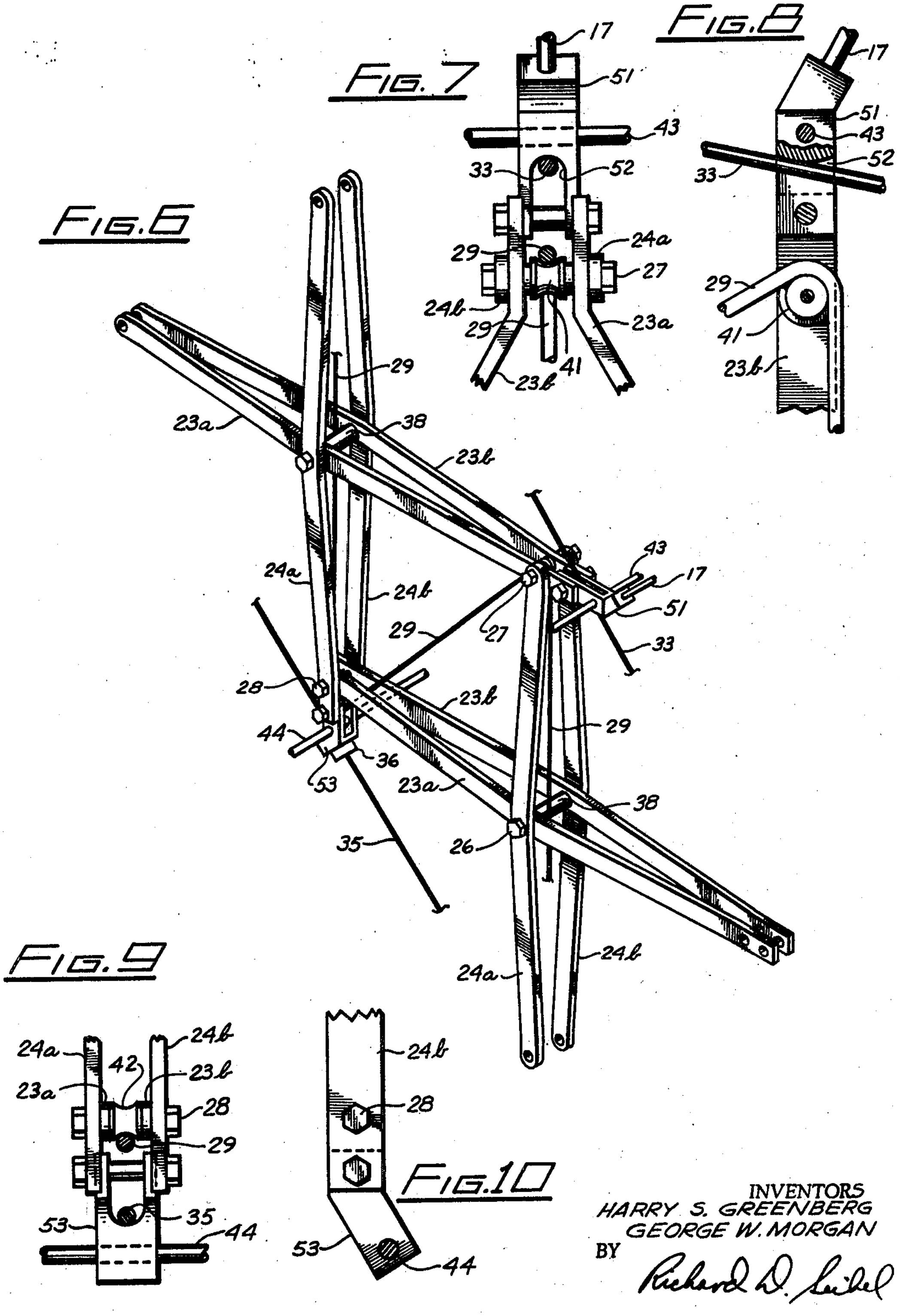
Figure 11:
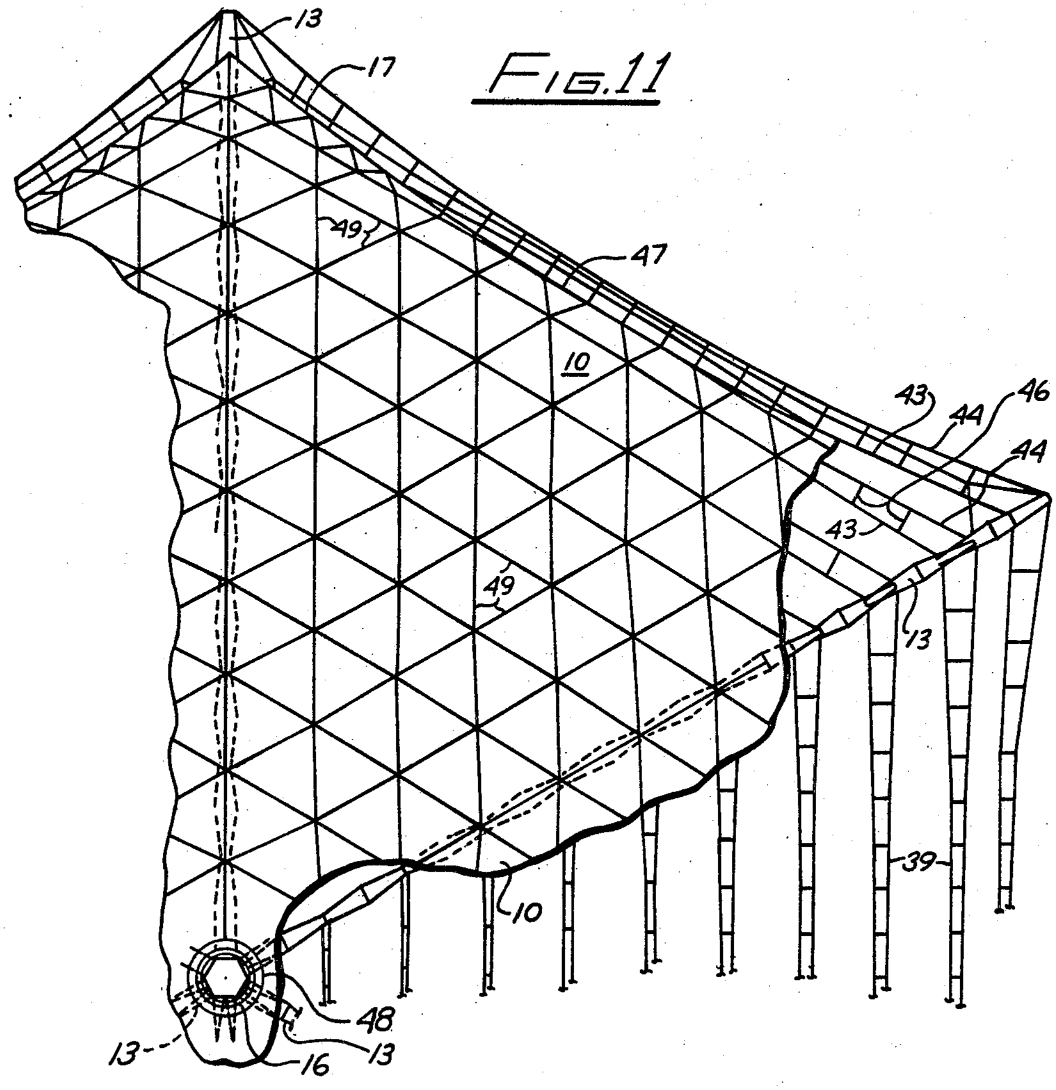
Figure 30:
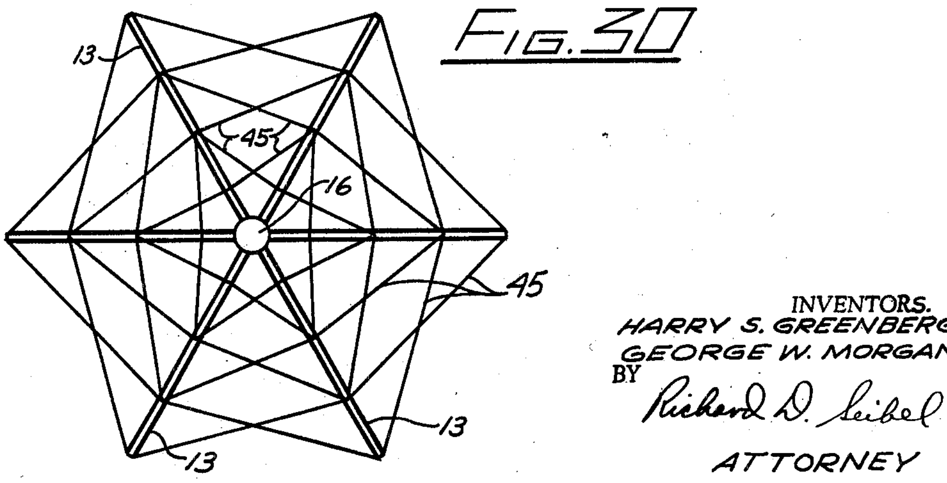
Figures 15, 16, 17, 18:
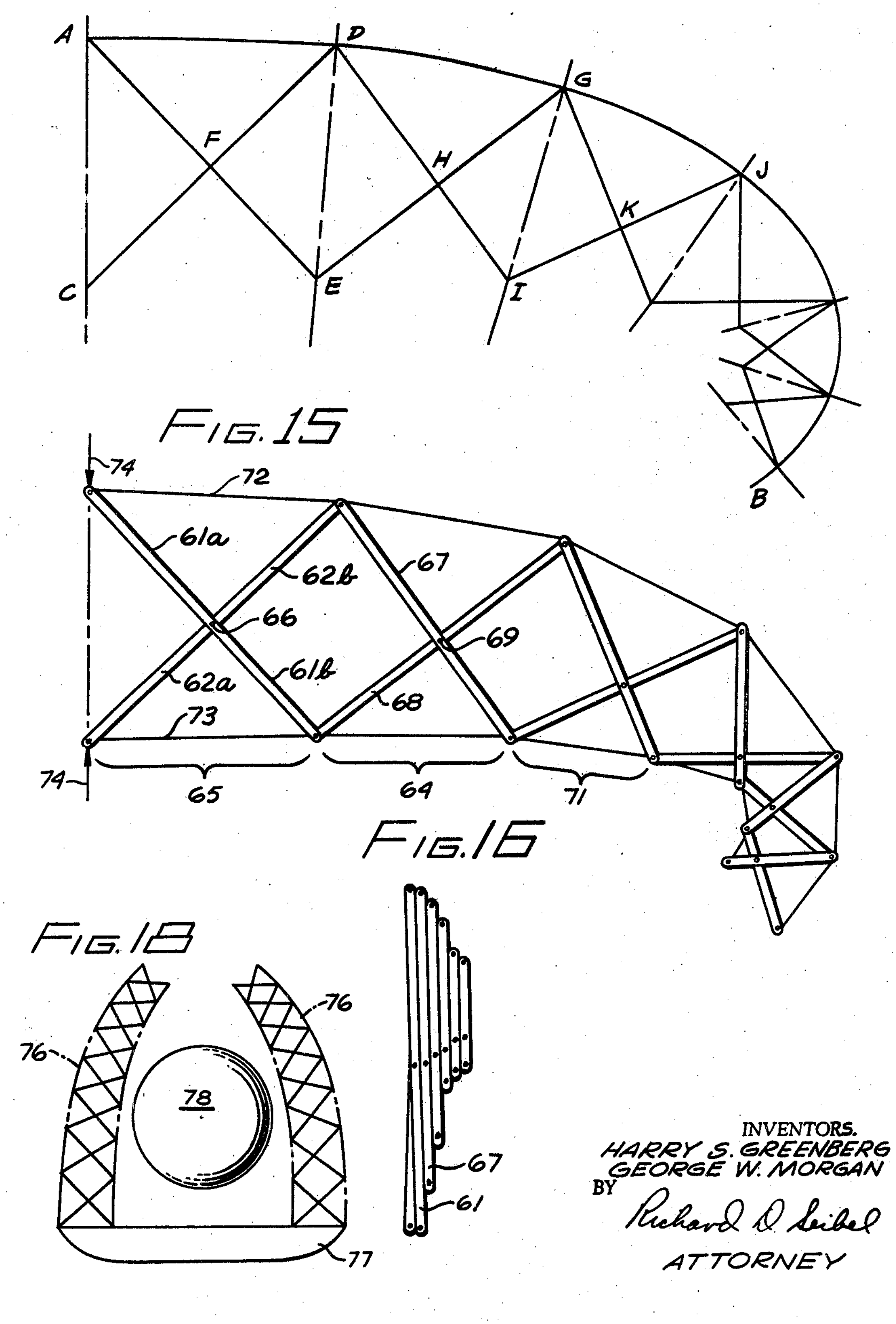
Figure 19:
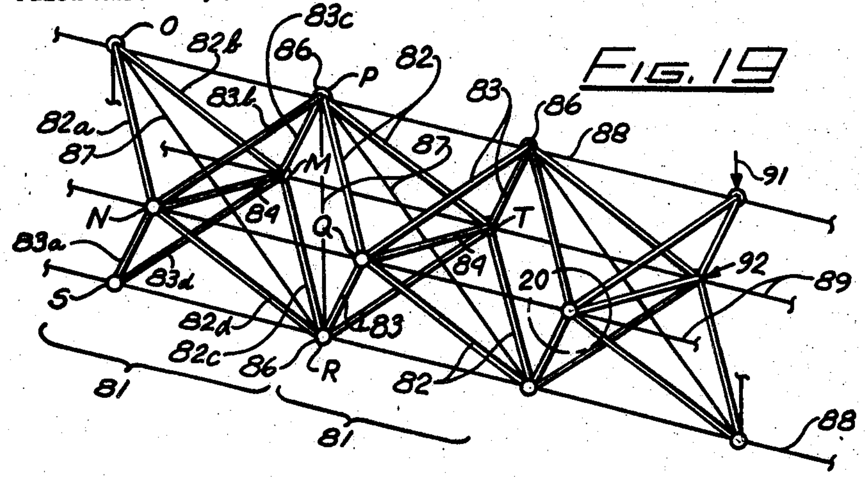
Figures 20, 21:
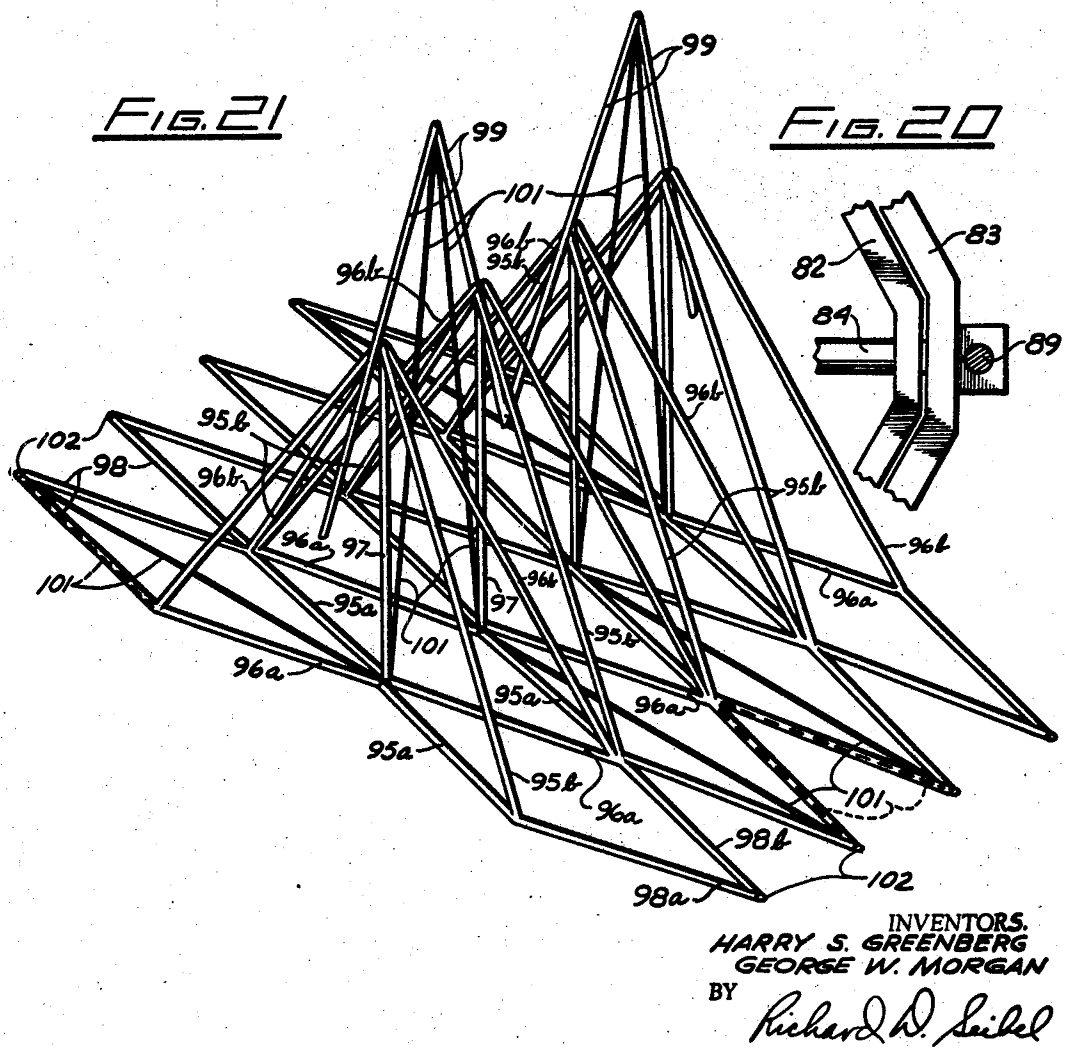
Figures 22, 23, 24, 25, 31:
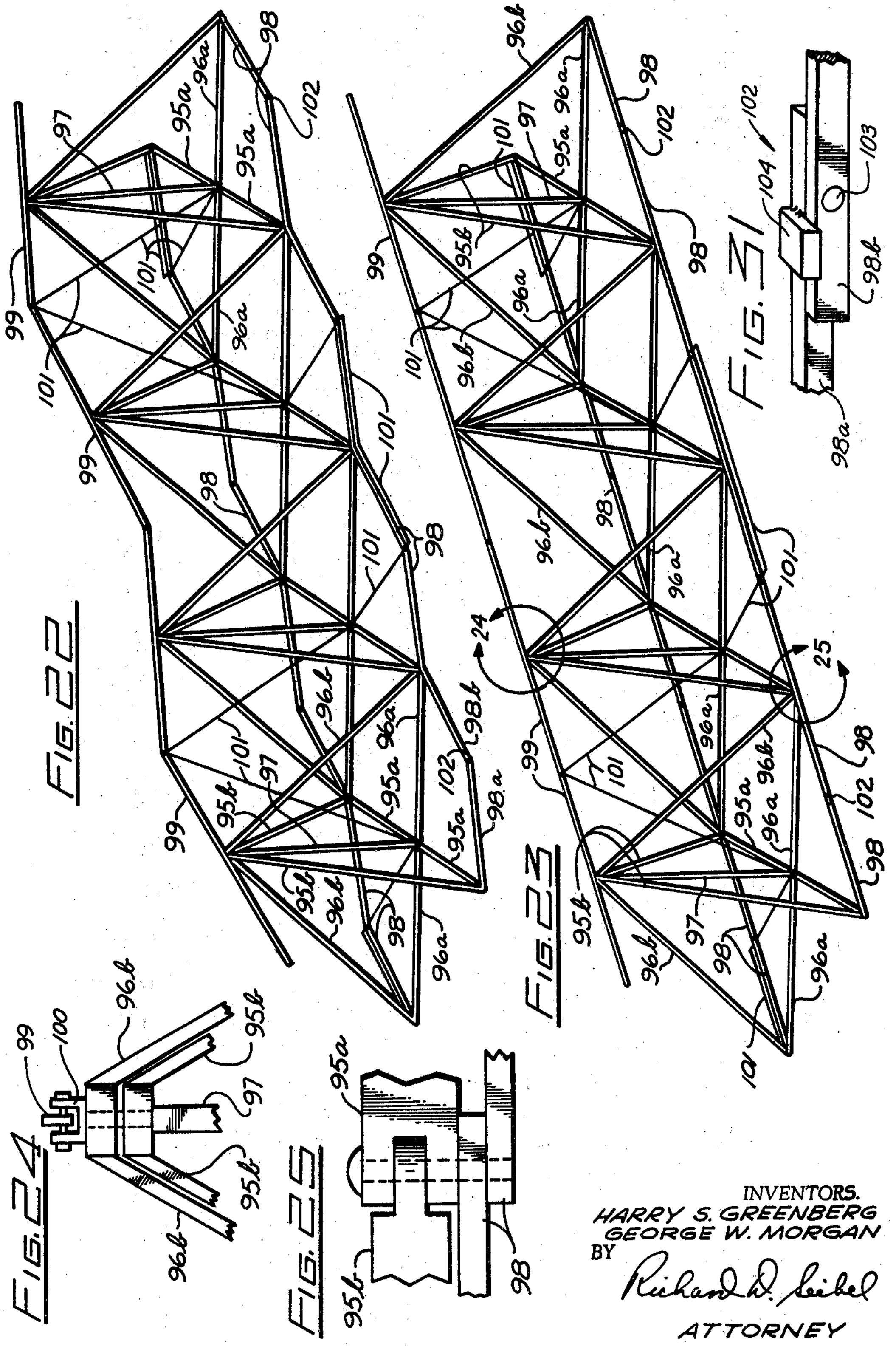
Figures 26, 27, 28:
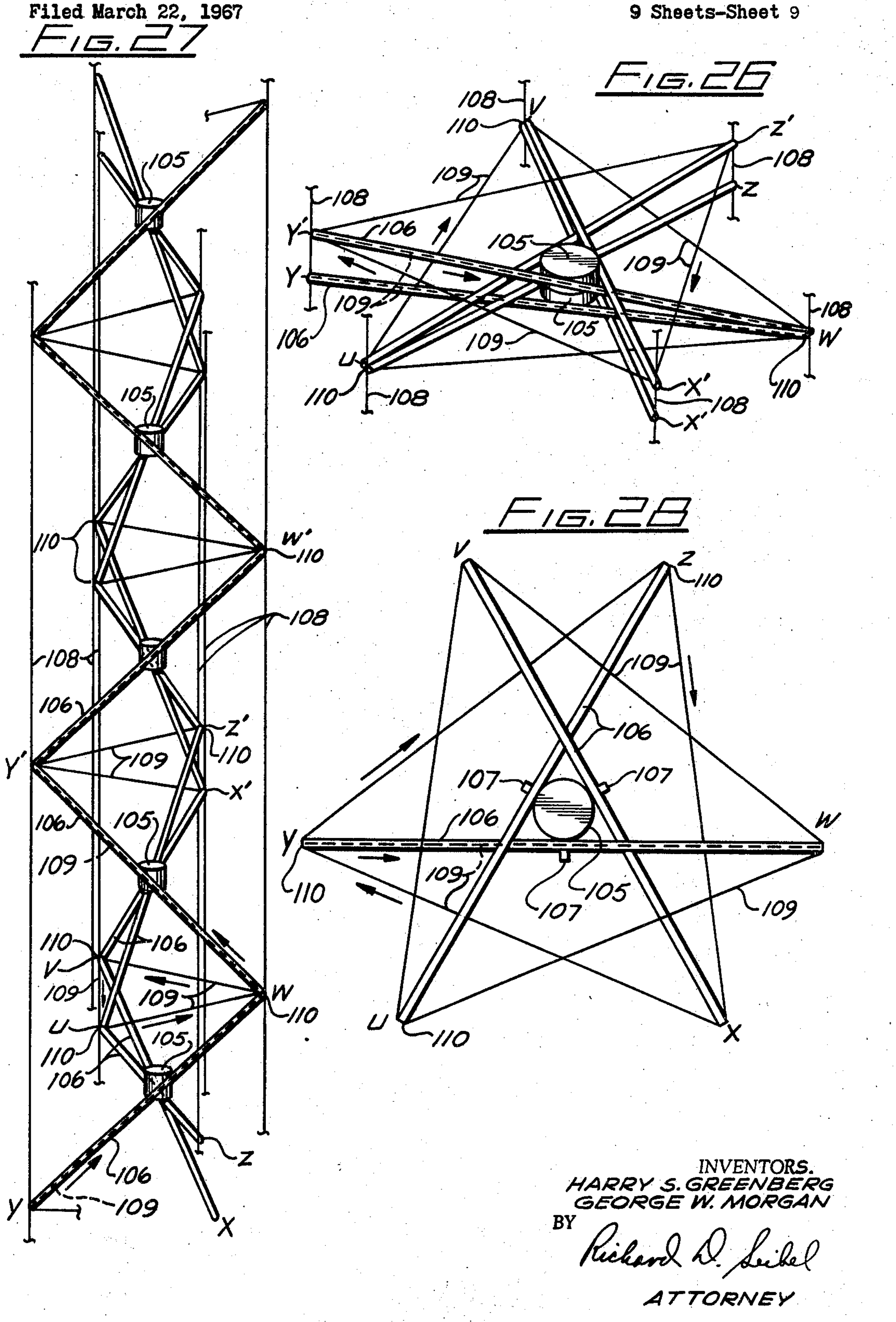

FIG. 5 comprises a schematic illustration of a circularly curved extensible boom;

FIG. 6 illustrates in perspective two bays of the boom of FIG. 4;

FIG. 7 comprises a cable fitting on the concave side of the curved boom of FIG. 4;

FIG. 8 is a partial sectional view of the cable fitting of FIG. 7;

FIG. 9 comprises a cable fitting on the convex side of the curved boom of FIG. 4;

FIG. 10 is another view of the fitting of FIG. 9;

FIG. 11 comprises a partial front view of the antenna of FIG. 1 with a portion of the antenna surface cutaway;

FIG. 12 comprises a side view of a connector for attaching the antenna reflector surface to the framework of extensible booms;

FIG. 13 is a front view of the connector of FIG. 12;

FIG. 14 comprises a side view of a typical intercostal cable truss interconnecting the extensible booms of the antenna of FIG. 1;

FIG. 15 illustrates schematically a non-circular curved boom constructed according to the principles of this invention, said boom being in an extended position;

FIG. 16 illustrates the curved boom of FIG. 15 in a retracted position;

FIG. 17 illustrates the geometric relationships of the elements of the boom of FIG. 15;

FIG. 18 illustrates schematically a typical use of the boom of FIG. 15 in a space recovery vehicle;

FIG. 19 comprises a perspective view of an extensible structure, cable braced to carry bending loads;

FIG. 20 illustrates a typical cable connection for the structure of FIG. 19;

FIG. 21 illustrates in perspective a triangular extensible truss constructed according to the principles of this invention, said truss being in a substantially retracted position;

FIG. 22 comprises a perspective view of the truss of FIG. 21 in a partially extended position;

FIG. 23 comprises a perspective view of the truss of FIG. 21 in a fully extended position;

FIG. 24 illustrates a typical pivot joint at an apex of the triangular truss of FIG. 21;

FIG. 25 illustrates a typical pivot joint at another apex of the triangular truss of FIG. 21;

FIG. 26 comprises a perspective view of another embodiment of extensible structure constructed according to the principles of this invention, said structure being in a retracted position;

FIG. 27 comprises a perspective view of the structure of FIG. 26 in an extended position;

FIG. 28 comprises an end view of the structure of FIG. 27;

FIG. 29 illustrates schematically two steps in deploying the antenna of FIG. 1;

FIG. 30 comprises a schematic front view of diagonal bracing for the antenna of FIG. 1; and FIG. 31 illustrates a typical locking joint for the extensible structure of FIGS. 21 to 23.

Throughout the drawings like reference numerals refer to like parts.

Detailed description

In the practice of this invention according to a preferred embodiment there is provided an antenna as illustrated in FIG. 1 which comprises a reflective surface or membrane 10 which is preferably in the shape of a paraboloid. Located at the center of the paraboloid is a structural member such as a telescoping boom 11 at the outer end of which is mounted the antenna feed 12. It will be recognized by those skilled in the art that such an antenna can be used for transmission wherein energy is directed from the feed 12 to the reflective surface 10 and radiated in a conventional manner, and by the same token the antenna may be employed as a receiving antenna wherein radiation such as radar, microwave, or the like, impinges on the reflective surface 10 and is directed to the feed 12 in a conventional manner. Such a surface may be arranged to reflect other types of radiation including light or infrared.

The antenna constructed according to a preferred embodiment is in substantially a hexagonal shape when viewed from the front. Since the effective area of an antenna is a circle which is illuminated by radiation from the feed a hexagon is preferred since this polygon most nearly circumscribes a circle without having an undue number of structural members as hereinafter described. Other regular and irregular polygons may also be employed. The basic hexagonal shape of the antenna is formed by radiating booms 13 described in greater detail hereinafter. A plurality of cables 14 or the like extend between points of the hexagon at the ends of the radial booms 13 and the feed horn 12 at the outer end of the telescoping column 11. When the booms 13 are fully extended and the telescoping column or boom 11 is fully extended these members are in compression and the cables 14 are in tension to provide a substantially rigid structure.

Figure 2:
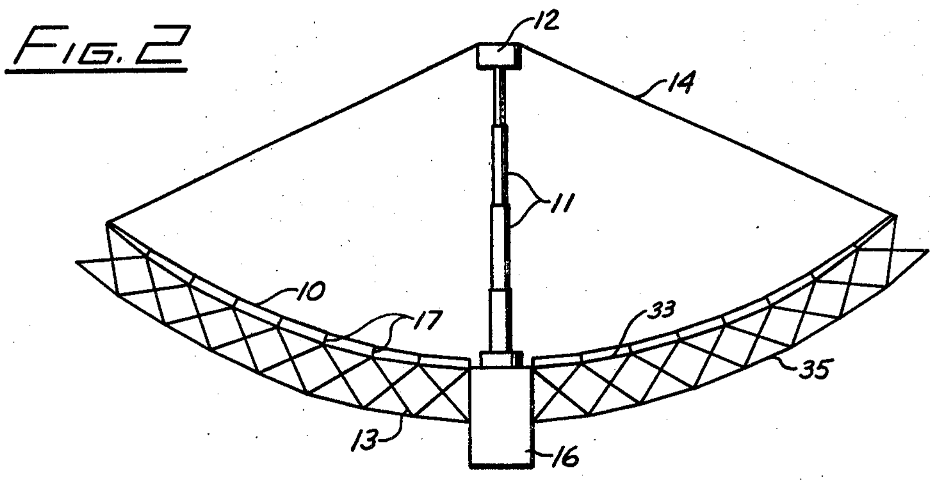
FIG. 2 is a transverse cross-section of the antenna of FIG. 1 in an extended position.
Figure 3:
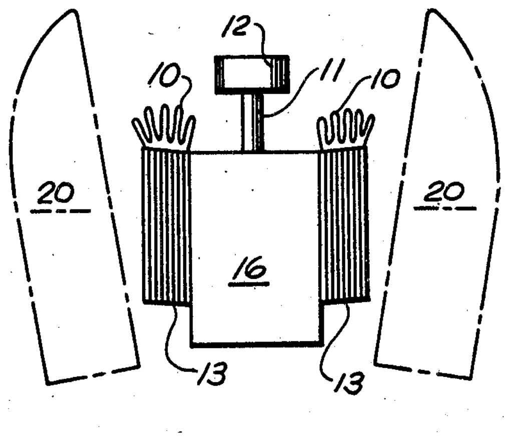
FIG. 3 is a transverse cross-section of the antenna of FIG. 1 in a retracted position.

In a typical embodiment the antenna may, for example, be employed as a principal element of a spacecraft as illustrated in FIGS. 2 and 3. In FIG. 2, which comprises a transverse schematic cross-section of an antenna, there is provided a spacecraft 16 from which radiate the structural booms 13 which support the reflective membrane 10 of the antenna. The membrane 10 lies on the concave side of the booms 13 which are each curved in a circular arc so that collectively they define a portion of a spherical surface. The membrane 10 is connected to the booms 13 by a plurality of drop cables 17. The antenna as illustrated in FIG. 2 is in a deployed or extended condition as it would be employed, for example, in an orbiting spacecraft. In order to launch such a large extended structure considerable structural strength, heat protection, and a massive launch vehicle would probably be required.

It is therefore desirable that the antenna be retracted for purposes of launch as illustrated in FIG. 3. As illustrated in this figure the booms 13 are folded as hereinafter described, against the sides of the spacecraft 16. The telescoping boom 11 is retracted so that the feed horn 12 is also adjacent the spacecraft 16. The membrane 10 which is preferably formed of a flexible material is folded as illustrated schematically in FIG. 3 to form a compact bundle which is preferably enclosed in an aerodynamic shroud or fairing 20 for launch. The shroud is jettisoned before the antenna is extended to the deployed condition. In deploying the antenna it is preferred to first extend the telescoping boom 11 which can comprise, for example, a plurality of telescoping cylinders or may be an extensible structure constructed according to the principles of this invention. Concurrently or sequentially with extension of the feed boom 11 the radial booms 13 are extended, thereby putting the cables 14 in tension and greatly enlarging the size of the antenna. With an antenna such as shown retracted in FIG. 3 and extended as in FIG. 2 the ration of extended diameter to retracted diameter can readily be as much as 20:1. Thus, for example, an aerodynamic shroud 10 feet in diameter can readily accommodate a retracted antenna which is deployed in orbit to have a maximum extended diameter of nearly 200 feet.

In order to better illustrate the principles of this invention, FIG. 4 is a detail of one of the extensible or protrusile booms 13 which radiate from the spacecraft 16 to the six corners of the hexagonal structure. On the side of the spacecraft 16 which is preferably a circular or hexagonal cylinder there is provided a pivot connection 18 which provides a structural link between the boom and the spacecraft at the concave side of the boom. A slideway 19 is provided on the side of the spacecraft in line with the pivot connection 18 for containing a pin 21 for interconnecting the convex side of the boom 13 with the spacecraft 16. The boom 13 is preferably formed in a plurality of substantially identical bays 22 of which eight are shown in the embodiment of FIG. 4. It will be appreciated that a greater or lesser number of bays can be provided as desired for a particular use of the extensible boom.

Each of the bays 22 of the boom comprises a first link 23 and a second link 24 which are joined at a point intermediate their ends by a pivotal connection, 26 so that the two links 23 and 24 are capable of scissor-like motion. The first links 23 are substantially identical in each of the bays 22 along the length of the boom, although the first link 23 adjacent the spacecraft may have special means for accommodating the pin 21 joining the link to the spacecraft and the last link in the exterior bay may have special means for connecting to cables hereinafter described. Similarly each of the second links 24 is substantially identical in each of the bays 22 along the length of the boom although the second link 24 in the bay adjacent the spacecraft may have special means for accommodating the pivotal connection 18 on the spacecraft.

Thus, in the first bay adjacent the spacecraft the first link 23 is slidably and pivotally connected to the spacecraft by the pin 21 which is captive in the slideway 19. Similarly, the second link 24 in the first bay is pivotally connected to the spacecraft 16 by the pivotal connection 18. At the outer end of the first bay the first link 23 is joined to the second link 24 in the second bay by a pivotal connection 27. Similarly the second link 24 in the first bay is joined to the first link 23 in the second bay of the boom by a pivotal connection 28 which is on the convex side of the curved boom. Similarly the first and second links 23 and 24 of the second bay are joined to the second and first links 24 and 23 of the third bay by pivotal connections 27 and 28, respectively. Thus also in the successive bays 22 of the boom each of the first links is connected to a second link and each of the second links is connected to a first link by pivotal connections.

Thus each of the booms 13 in the antenna is retractable or extensible in the general manner of a lazy tongs. Numerous improvements, however, are present in the extensible booms as described herein as compared with the conventional lazy tongs. A conventional lazy tongs has no substantial torsional rigidity or bending rigidity in a plane normal to the plane of scissoring action, however, such rigiditiy is provided in the illustrated boom as hereinafter described. In a conventional lazy tongs, extension is only in a linear direction and in the described boom the extension is in a non-linear direction as hereinafter described. In a conventional lazy tongs the force causing extension or retraction of the boom is provided only at the end of the boom, thereby leading to substantial bending moments in the links forming the boom. In the illustrated boom, however, the opening forces are distributed along the length of the boom for minimal bending moments.

In order to extend the boom 13 a zigzag cable 29 is provided running outwardly along the length of the boom, The cable is wound on a conventional drum 31 within the spacecraft 16 and extends over a pulley (not shown) at the pivot 18 where the second link 24 in the first bay is connected to the spacecraft. The cable then extends along the second link 24 and passes over a pulley (not shown in FIG. 4) at the pivot point 28 between the second link of the first bay and the first link of the second bay. The cable 29 then extends substantially along the boundary between the first and second bays 22 around a pulley 41 (not illustrated in FIG. 4) at the pivot point 27 between the first link 23 of the first day, and the second link 24 of the second day. The cable 29 then extends along the length of the second link 24 of the second bay and continues in the same manner between the pivot points 27 and 28 alternately along the full length of the boom, finally being fixedly connected at a point 32 at the outer end of the boom.

It will be apparent that when the boom 13 is retracted, the distance between the pivot points 27 and 28 at the boundary of a pair of bays is greater than when the boom 13 is extended as illustrated in FIG. 4. The length of the cable within the link 24 remains constant, of course. A greater length of zigzag cable 29 is therefore needed to string the boom in the retracted position than in the extended position. It will also be apparent that winding of the cable 29 on the drum 31 will tend to shorten the cable length, and, because of the passage of the cable between the pivot points 27 and 28 the pivot points will be drawn together, thereby moving the scissors joint 26 and extending the boom. The zigzag cable running along the full length of the boom applies a substantially constant force between each of the pivot points 27 and 28, along the length of the boom and thereby applies a distributed extending force on each bay of the boom with only minor differences due to friction in the joints. Since a substantially equal force is applied at each end of each of the bays of the boom there is substantially no bending moment applied to the links forming the bay except that minor force required for pivoting the scissor connection 26. The force at each bay is also a fraction of the force required if it were all applied at the first bay as in a conventional lazy tongs. The zigzag cable 29 thereby permits the uniform extension of a large number of scissors bays with a relatively small force and a relatively small bending moment on any element of the boom. As illustrated herein the zigzag cable 29 passes freely over pulleys, however, in another embodiment the cable can be clamped at the pivot points 27 and 28 in each bay after the boom is extended.

The total extension of the boom is preferably limited by a cable 33 which may, for example, extend along the concave side of the boom as illustrated in FIG. 4 or multiple cables can be employed as hereinafter described. The cable 33 is preferably fixedly connected at the outer end of the boom by a connection 34. The cable 33 is in slidable connection with one end of the first links 23 of each of the bays. It will be apparent to one skilled in the art that in order to provide a particularly low friction slidable connection that pulleys can be employed if desired. The cable 33 after passing along the length of the boom is wound on a drum 37 within the spacecraft 16. As the zigzag cable 29 is wound up on to the drum 31, for extension of the boom, the cable 33, is payed out from the drum 37 at a rate to maintain the cable in some tension during extension of the boom.

It will be apparent to one skilled in the art that common drums, can be employed for similar cables for all six of the radially extending booms in the antenna described and illustrated herein. It should also be recognized that if it is desired the cable 33 can be of fixed length and left slack when the boom is in a retracted position and of a proper length to have tension therein when the boom is extended. It is convenient, however, to employ a drum 37 for the cable 33 so that reversing of the drive on the drums 31 and 37 causes the cable 33 to retract the boom from an extended position while the zigzag cable is payed out from the drum 31 at the proper rate.

There is also provided a cable 35 on the convex side of the boom, extending along the length of the boom. The cable 35 interconnects the pivot points 28 in each bay of the boom and bearing pads 36 are provided on the cable, one for each bay thereof. The bearing pads 36 are fixed to the cable 35 at carefully selected locations during initial assembly and adjustment of the antenna so that each pad 36 bears on the end of a link 24 when the cable 35 is retracted as hereinafter described. The cable 35 is stored slack in each bay when the boom is retracted and upon extension is nearly taut. After full extension of the boom the cable 35 is wound up a short amount on a drum 40 in the spacecraft and each bearing pad 36 successively bears on its respective link 24 to rigidify the boom. In the alternative an electric actuator can be provided in each bay for controllably varying the length of the cable 35. When this embodiment is employed the cable 35 is fixed at each pivot point 28. A typical actuator comprises an electrically driven turnbuckle, for example, and the actuators are preferably electrically connected for synchronous adjustment. It will be apparent that similar arrangements can be employed with the cable 33 on the concave sides of the boom.

In order for the boom 13 to extend in a nonlinear direction along a preselected curve, it is necessary that the links 23 and 24 be nonsymmetrical about the pivot point 26. The preferred relation between the lengths is illustrated in FIG. 5 which shows schematically two bays of a boom in both an extended and a retracted position. As illustrated in FIG. 5, the pivot points 27 and 28 between adjacent bays each line on a radius of a circle. Thus all of the pivot points 27 lie on a circular arc in both the extended and retracted positions. Similarly the pivot points 28 all lie on a circular arc concentric with the arc defined by the pivot points 27. Since the links 23 and 24 are substantially inextensible, the circular arc defined by the pivot points 28 has a shorter radius when the beam is extended than when the beam is retracted as illustrated schematically in FIG. 5.

The scissors pivot points 26 in each of the bays is defined by the intersection of lines lying between opposite ones of the pivot points 27 and 28 respectively at the corners of the bays. Since the individual bays are each essentially trapezoids the intersection of the diagonals at the point 26 is displaced from the center of the diagonals. Thus the lengths of the links between the scissors pivot connection 26 and the pivot connections 27 at the concave side of the bay is less than the lengths of the links between the scissors pivot points 26 and the pivot points 28 at the convex side of the bay. Since the pivot points 27 and 28 lie on concentric circular arcs the intersection of the diagonals at the scissors pivot points 26 also lie on a circular arc concentric therewith. The circular arc defined by the scissors pivot points 26 when the boom is extended is of a shorter radius than the circular arc defined by the intersections 26 when the boom is retracted. By constructing a boom with nonsymmetrical links 23 and 24 as illustrated in FIG. 5 a boom that is retracted in an approximately flat bundle can be extended in a circular arc.

In order to provide torsional stability in the boom it is preferred that each of the links 23 and 24 be constructed in the form of a diamond-like quadrilateral figure as illustrated in FIG. 6. As illustrated therein the link 24 is formed of two strips **24*a* and 24*b* which are preferably substantially identical. The two strips, 24*a* and 24*b*, are bent in a broad V shape and brought relatively closer together at the pivot points 27 and 28 with the central scissors pivot points 26 being spaced relatively further apart on the two strips. Similarly, the first link 23 is formed in a quadrilateral figure formed of two strips 23*a* and 23*b* which are also bent into a broad V shape with the ends of the strips brought relatively closer together at the pivot points 27 and 28 and the centers relatively further apart at the pivot point 26. The aspect ratio of the links is preferably about 6:1. That is, they are about 6 times as long between the end pivots as they are wide in the middle. In the illustrated embodiment the first link 23 is constructed so as to be somewhat smaller laterally than the second link 24 so that the quadrilateral figure fits within the second link for pivoting. As pointed out hereinabove the links are not symmetrical about their midpoint so that curved extension is obtained. Thus the quadrilateral figure is only diamond-like since the four sides of the links are not exactly equal. A pivot bar 38 is provided across the center of the quadrilateral link at the scissors pivot point 26** for keeping the two quadrilateral links spread apart.

As can be seen in FIGS. 6 to 10 the zigzag cable 29 passes over a pulley 41 at each pivot point 27 thence along the length of the second link 24 and around a pulley 42 at the pivot point 28. The zigzag cable 29 then extends between the pivot points 28 and 27 joining two bays of the structural boom. The zigzag cable 29 passes over and slightly bears against the pivot bar 38 in the center of the link and, if desired, a pulley can be provided for minimizing friction at this point; however, it has not been found necessary, due to the inherent lubricity of synthetic fibers, to provide a pulley at this point when nylon cables or the like are employed. Similarly, if desired, a pulley can be provided at the pivot 27 for engaging the cable 33; however, again, it has been found that a sliding contact is sufficient.

A typical fitting 51 on the concave side of the boom is illustrated in FIGS. 7 and 8 in somewhat greater detail than shown in FIG. 6. The fitting 51 has an opening therein for the pulley 41 over which the zigzag cable 29 passes. A bearing surface 52 is provided in the fitting for sliding contact with the cable 33 which extends along the length of the boom on the concave side thereof. The fitting 51 also clamps the upper intercostal cable 43 hereinafter described and also provides an end mounting for the cable 17 which connects the membrane 10 (not shown in FIG. 6) with the boom.

Similarly, a fitting 53 is provided at each of the pivot points 28 on the convex side of the boom for connecting cables to the boom. A typical end fitting 53 is shown in more detail in FIGS. 9 and 10. Within the fitting 53 is an opening for the pulley 42 over which the zigzag cable 29 rides.

Similarly, the fitting 53 clamps the intercostal cable 44 hereinafter described and provides sliding contact for the cable 35 along the convex side of the boom.

Due to the breadth of the links at the pivot 26 the beam has appreciable torsional rigidity for precluding general instability under compression loads. Flexural rigidity for limiting deflection of the boom in a direction normal to the plane of the scissoring action can readily be provided as is pointed out hereinafter, by cables interconnecting successive pivot points 26 in adjacent bays of the boom. It should also be noted that by skewing the pivot points 27 and 28 relative to the links that some curvature of the boom can be provided in a direction normal to the plane of the scissoring action.

A network of cable intercostals 39 is provided interconnecting each pair of the six radiating structural booms of the antenna. A portion of the reflective membrane 10 and system of intercostals 39 is illustrated in a partial cutaway view in FIG. 11. The intercostals 39 are tension cable trusses interconnecting the booms and among other things they transmit forces between the booms and the membrane which is attached to the intercostals as hereinafter described. Because of the symmetry of the hexagonal network of the booms and intercostals there are no significant transverse loads on the booms due to the intercostals.

A typical intercostal truss 39 is illustrated in FIG. 14 which comprises a view transverse to a pair of booms 13 and along an intercostal truss 39, that is, the section is taken along an angled line lying substantially parallel tot he periphery of the antenna. Because of the angled line of this section, distortions are shown in FIG. 14 at the intersection of the membrane 10 with the booms. It will be appreciated that in a straight section through a structure of this nature the membrane 10 comprises a smooth arc at its passage over the booms 13 and does not have the scalloped effect suggested by the section of FIG. 14.

FIG. 14 illustrates transverse sections of two of the booms 13 further showing the quadrilateral figure forming the links 23 and 24. Between each pair of the booms 13 there are provided a first intercostal cable 43 nearer the concave side of the antenna and a second intercostal cable 44 nearer the convex side of the antenna. A plurality of truss cables 46 are provided at intervals along the length of and substantially normal to the intercostal cables 43 and 44. The truss cables 46 interconnect the first and second intercostal cables and have progressively shorter lengths as the distance from the nearer boom increases. This causes the intercostal cables 43 and 44 to diverge near their ends adjacent the booms 13 and converge near the center between the pair of booms. The network of intercostal cables and truss cables is thus in substantial tension thereby inducing compression forces and bending moments on the booms 13. The principal loads in the antenna are thus tension loads in the intercostal cables and compression forces and bending moments lying substantially along the length of the booms. The bending moments tend to cause deflection in the plane of the scissoring action and these are reacted by the cables along the concave and convex sides of the booms. Because of the symmetry of the antenna and the presence of intercostal cables on each side of each of the booms, the forces are substantially balanced and no substantial transverse load is applied to the booms which would result in deflection normal to the plane of the scissoring action. Shear loads are also applied to the booms by way of the drop cables 17 connected thereto and additional drop cables 17 connected to the intercostals (FIG. 4).

At least a part of the load applied by the intercostals to the booms in a direction toward the center of the antenna is countered by the force of the two intercostal cables 43 and 44 acting on the links of the boom in such a direction as to urge the boom toward extension, that is, tending to pull the pivot points 27 and 28 closer together. This counteracting force is, however, relatively small compared with the force by the intercostals tending to compress or retract the booms. The intercostal cables 43 and 44 are connected to the links 23 and 24 respectively, at the outer ends thereof as may be more apparent from examination of FIGS. 6 to 10. It should be apparent that any conventional means for connecting cables 43 and 44 to the booms and interconnecting the cables 43 and 46, for example, can be employed.

At the intersection of an intercostal with the boom the intercostal trusses each lie along a radius through the origin of the circle defining the curved boom. Thus, the intercostal trusses 39 near the center of the antenna are more nearly parallel to the axis of the antenna than the intercostal trusses 39 near the periphery. The intercostal trusses near the periphery of the antenna lie at a substantial angle to a plane normal to the axis of the antenna and thereby provide a truss-like structure capable of asserting an outwardly directed component of force on the membrane 10. The progressive tilt of the intercostal trusses nearer to the edges of the antenna is noticeable in the front view of FIG. 11 wherein the intercostal trusses appear wider near the periphery of the antenna even though all of the intercostal trusses have substantially the same depth.

The booms and intercostals form a structural arrangement having substantial rigidity. The individual intercostals are entirely in tension and are formed in truss-like arrangements. The individual booms have compression and shear loads and bending moments applied thereto since the tension-bearing intercostals intersect the individual booms at an angle tending to compress the booms towards the spacecraft at the hub of the antenna. The booms are kept from buckling by the plurality of intercostals connected thereto along the length of the boom. The compression and shear loads are reacted by the links 23 and 24 in each bay which are relatively short and the bending moments are reacted by the cables 33 and 35 on the concave and convex sides of the boom respectively. The cable 33 resists induced compression load as a result of the prior pretension from the zigzag cable 29 and the links 23 and 24 also bear compression loads due to the tension from the zigzag cable. The magnitude of pretension applied is determined by the loads applied by the drop cables 17 on the intercostals 39 and hence the booms. The drop cable loads are dependent on the membrane tension loading required to contour the reflective surface as hereinafter described. The compressive load applied to the boom is converted to a tension load in the zigzag cable and thereby transmitted to the spacecraft. The network of booms, intercostals and the zigzag cable thereby provides a rigid structure after the antenna is deployed.

If an attitude orientation control system for a spacecraft has high roll rates, increased rigidity of the antenna may be required to limit rotational deflections of the booms relative to the hub. A network of diagonal bracing cables can readily be provided to alleviate this potential problem. Such an array of bracing cables 45 is illustrated in FIG. 30 wherein the membrane and intercostals have been deleted to more clearly show the diagonal cables. These cables 45 are secured to adjacent booms 13 at different distances from the spacecraft 16 so that a triangular force network is established for resisting either clockwise or counterclockwise rolling.

In order to provide the antenna with a reflector, a reflective membrane 10 is arranged adjacent to the structural network of booms and intercostal trusses on the concave side thereof (FIGS. 4 and 11). The membrane which comprises a flexible material can, for example, be a network of wires woven or otherwise interconnected or can comprise a fabric or plastic film covered with a continuous metal layer to provide electrical conductivity. Similarly, the membrane 10 may comprise a plastic material having a network of fine wires or metal filaments imbedded therein to provide electrical conductivity. If a network of conductors is employed, the spacing therebetween must be appreciably less than one-fourth of the wavelength for which the antenna is designed. It is preferred to employ a thin plastic film coated with a thin metal layer. In any event, the membrane 10 should be a light weight thin, flexible material for ease of folding upon retraction of the antenna, low launching weight, and minimal tension loads for eliminating folds and wrinkles. If the structure is employed for reflecting light or infrared, a metallized plastic film is also preferred.

At the outer edge of the membrane 10 around the periphery of the antenna there is provided a peripheral cable 47 in which a tension force is generated by connection to the booms 13. Similarly, at the inner edge of the membrane 10, around a hole for the feed boom there is provided a cable 48 carrying a tension load reacting the radial load in the membrane 10. A plurality of faceting cables 49 lying on the membrane are provided adjacent to and approximately parallel with the cable 43 in each of the intercostal trusses 39. The faceting cables 49 are parallel with the intercostal trusses in one sector of the antenna and extend substantially along the surface of the membrane 10 into an adjacent sector of the antenna. Thus, each of the faceting cables 49 extends in three sectors of the antenna and crossing faceting cables 49 from each of three sectors defines a network of approximately equilateral triangles in each of the sectors dividing the reflective membrane 10 into a plurality of triangular facets each having one side approximately parallel with the periphery of the antenna in that sector and the other two sides approximately parallel the radiating booms defining that sector of the antenna. It will be appreciated that the facets are not all exactly equilateral triangles since the antenna surface is a paraboloid which is not exactly covered by a matrix of only completely equilaterial triangles.

The faceting cables 49 are connected to the intercostal trusses 39 or the booms 13 by a plurality of drop cables 17. Each of the drop cables 17 is connected to three of the faceting cables 49 as illustrated in FIGS. 12 and 13. As illustrated herein in a typical embodiment, the membrane 10 comprises a plastic sheet 56 on which a thin layer of metal 57 is deposited for providing electrical conductivity to the membrane. The drop cable 17 is connected to a small button 58 which lies on the concave side of the membrane 10. Three intersecting faceting cables 49 are also connected to the button 58 so as to lie on the concave side of the membrane 10. Because of the tension in the membrane and its concave shape, it is held against the faceting cables 49 as hereinafter described.

By selecting the appropriate lengths of the drop cables 17 between the membrane and the intercostal cables, the surface of the membrane is made to conform to a substantially paraboloid shape. The surface of the membrane in each of the approximately equilateral facets is substantially flat since a tension is maintained throughout the membrane. The peripheral cable 47 on the membrane tends to pull the membrane toward a plane and the drop cables 17 connected to the faceting cables 49 tend to pull the membrane away from a plane. These two counteracting forces provide a tension in the faceting cables 49 and maintain the facets substantially flat. It will be recognized by those skilled in the art of antennas that the faceted antenna as formed by the reflective membrane 10 is as effective as a true paraboloid so long as dispersion caused by the flat facets does not reflect the beam beyond the ability of the feedhorn 12 (FIG. 1) to accept the reflected beam. The size of the facets provided in an antenna built in accordance with the practice of this invention is determined by conventional means according to the aperture of the antenna and the wavelength for which it is designed.

A distinct advantage lies in the employment of a plurality of radial structural beams 13 and a network of intercostal trusses 39 therebetween for providing the principal structural aspects of the antenna and the provision of a light weight membrane reflector spaced apart from the structural members. In previous large antennas it has often been the practice to attach the reflective surface directly to the structural members carrying the principal structural loads of the antenna. Because of this, in order to achieve the surface tolerance required for a high performance antenna, means are provided for adjusting the surface after assembly, however, any adjustment of structural members to which the surface was attached affected adjacent structural members, which in turn, affected the adjacent membrane surface. Thus, the final adjustment of a reflective surface of a large antenna often required many iterations to bring the entire surface to a desired accuracy.

In an antenna structure provided in the practice of this invention the reflective membrane is separated from the principal structural elements and is attached thereto principally by the drop cables 17. The load on the drop cables 17 is relatively slight when compared with the magnitude of loads on the intercostal trusses and the radially extending booms. Thus the length of the drop cables 17 can be adjusted to bring the entire antenna surface to a required tolerance without appreciable change in the loads, and hence, positions, of the intercostal and boom structural members. This greatly simplifies and accelerates the process of adjusting the antenna surface for a required tolerance.

This improved result is obtained by empolying a very light weight, low flexural strength membrane for the reflective surface with a peripheral tension member tending to pull the membrane towards a plane and a relatively large number of faceting cables attached to drop cables at the corners of facets on the antenna surface tending to pull the membrane out of a plane. Each of the large number of drop cables carries a relatively small load corresponding only to the minor load on the antenna membrane in the adjacent facets thereof. The membrane is tailored so that only light loads are required to keep the facets flat.

It should be appreciated that the telescoping boom 11, the links 23 and 24, and many other elements of the antenna appear herein as rather large or heavy structures merely for purposes of illustration. It will be appreciated that in an antenna as is provided in the preferred embodiment, particularly for use in space, that very light weight structural members having very small cross sections are employed throughout the antenna. Somewhat larger structural elements may be employed in ground based antennas wherein the loads of gravity on the antenna are active. Relatively heavy and large cross section members have been illustrated herein to demonstrate the principles of this invention and modification of the individual structural elements for optimum size can obviously be made.

In order to construct and operate an antenna as provided according to a preferred embodiment a plurality of radially extending booms 13 are joined to a spacecraft 16 and extended to the position of maximum extension prior to launch. This maximum extension is fixed by the cable 33 extending from the spacecraft outwardly along the radial booms. A network of intercostal cable trusses 39 is then interconnected between the booms so that each of the intercostals is tension loaded. The relative lengths of the cables forming the intercostal trusses are adjusted as required to provide a balanced load system and a substantially rigid antenna framework when fully extended. Concurrent with rigging of the intercostals, the antenna feed boom 11 and the cables 14 between the end of the feed boom 11 and the radiating booms 13 may also be placed and adjusted.

Then a membrane 10 is stretched over the antenna surface by the peripheral cable 47 and the drop cables 17 are approximately adjusted so that the antenna surface, as defined by the membrane 10 is approximately paraboloid. At this point precise adjustments of the length of the drop cables 17 can be made to any desired degree of accuracy and a minimum number of iterations of the adjustments is required. With a typical low weight membrane and an antenna in the size range of from 100 to 150 feet, the antenna surface may be adjusted to the paraboloid shape with only two or three adjustments of the drop cables 17.

After the membrane surface is adjusted to the paraboloid shape the radiating booms 13 are retracted by winding up the cables 33 on the drum 37 and simultaneously paying out the zigzag cables 29 from the drum 31. This retracts the booms of the antenna and thereby draws the intercostal cables and the membrane towards the spacecraft for encompassing in an aerodynamic shroud. When retracted the cables and membrane are slack and can be folded or reefed as desired. Such an antenna is launched in a retracted position and after the need is passed the aerodynamic shroud 20 is jettisoned and the booms with the attached membrane and intercostal cables are extended by winding up the zigzag cable 29 on the drum 31. The antenna, as extended, returns to the same positions of the boom, intercostal trusses, membrane surface, and feedhorn provided in the original assembly of the antenna.

In order to deploy an antenna as herein provided, it is preferred to extend the feed boom 11 to its full length. Thereafter the zigzag cable 29 is wound up on the drum 31 and the cable 33 along the concave side of the boom is simultaneously unwound from the drum 37. The zigzag cable urges the scissors-like lazy tongs links toward an extended position and the six radiating booms are thereby extended until a desired extension of the cable 33 on the concave side of the boom is reached. At this point the booms are curved somewhat more acutely than in the final configuration due to tension in the cable 33 and absorbing the slack in the various pivot joints. The intercostal cables 39 are slightly slack as shown exaggerated in phantom in FIG. 29. The cables 35 on the convex side of the booms are nearly taut.

At this time the cable 35 is retracted so that the pads 36 bear on the ends of each bay. This action urges the booms toward a flatter curvature and induces tension in the cables 33 on the convex side of the boom and in the intercostal cables 39 which for purposes of this analysis effectively extend across the antenna as illustrated in FIG. 29. Retraction of the cable 35 continues during initial assembly of the antenna until the desired curvature is obtained in the membrane 10 whereupon the bearing pads 36 are locked. Subsequently retraction of the cable 35 after deployment of the antenna returns it to its original shape. The flattening of the booms by retraction of the cables 35 thus induces tension in the intercostal cables and reflector membrane faceting cables 49 for providing a rigid structure and an accurate reflector surface.

In another embodiment of this invention a scissor link or lazy tongs type structure is employed to form a nonlinear boom of varying curvature. Thus as illustrated in FIG. 15 there is provided a spiral boom having a steadily increasing curvature from one end of the boom to the other end thereof. Such a boom can be described either as a spiral or as a "scorpion tail" boom.

Thus as illustrated in FIG. 15 there are provided first and second links 61 and 62, respectively, forming a first bay 63 of the boom in substantially the same manner as hereinabove described. The ends of the first bay 63 are not parallel so that a boom constructed of such bays would have a curvature of the same general sort as described and illustrated in FIG. 4. In addition, however, the ends of the links **61*b* and 62*b* on one side of their common pivot point 66 are shorter than the opposite ends of the links 61*a* and 62*a*, respectively. Since the links 61 and 62 are shorter at the outer end connecting to a second bay 64 than at the inner end, the depth of the boom, that is, the distance from the concave side to the convex side thereof, is less at the side of the first bay 63** where the first and second bay meet than at the opposite side thereof.

Similarly, the second bay 64 comprises first and second links 67 and 68 pivoted together at a point 69 to form a scissors connection. The ends of the links 67 and 68 towards a third bay 71 are shorter than the ends of the links 67 and 68 adjacent the first bay 63. This again causes the concave and convex sides of the boom to be closer together at the intersection between the second bay and the third bay 64 and 71, respectively, than at the intersection between the first bay and second bay 63 and 64, respectively. Subsequent bays along the boom also have nonsymmetrical links so that the sides of the boom converge. The links are also made nonsymmetrical so that the convex and concave sides of the boom each follow a substantially spiral path as hereinafter described.

In order to provide rigidity of the scorpion tail boom, a cable 72 is provided at the convex side thereof interconnecting the ends of the links and cable 73 is provided at the concave side of the boom interconnecting the other ends of the links. The cables 72 and 73 are maintained in tension by application of a force tending to extend the scissor elements or links forming the bays of the boom. Such a force can be applied at the intersection of each of the bays by a zigzag cable such as described hereinabove in relation to FIG. 4, or a single extending force can be applied as illustrated by the arrows 74 in FIG. 15. Such a force is transmitted along the length of the boom by the links forming the scissor elements thereof and tends to maintain the entire boom rigid. A single application of force as illustrated creates bending moments in the links of the boom which are readily accommodated as illustrated in FIG. 15 by having a substantial depth at one end of the boom where the forces are applied and an appreciably lesser depth of the boom at the end remote therefrom. In general, a zigzag cable along at least part of the boom is preferred to minimize bending moments.

As illustrated in FIG. 15 the boom is extended to the full length with the cables 72 and 73 in tension. The same boom is illustrated in a retracted position in FIG. 16 as it would be employed in launch of a spacecraft, for example. A typical application of such a scorpion tail boom is illustrated in FIG. 18 wherein a plurality of booms 76 are arranged around a spacecraft 77. In such an application the spacecraft 77 is maneuvered adjacent an object in space, arbitrarily shown as a sphere 78 in FIG. 18. During this maneuvering the booms 76 are retracted in the manner illustrated in FIG. 16 and after the spacecraft is adjacent the object to be recovered or captured, the booms 76 are extended to surround the object 78. It is found in extending scorpion tail booms of the type described and illustrated herein that the elements of the boom follow a pattern lying generally along the position of the boom in its extended condition. Thus, the booms 76 extend outwardly and when relatively remote from the spacecraft 77 curve towards each other and converge to encompass the object 78. It will be apparent to one skilled in the art that after the object 78 is encompassed by the booms 76, maneuvering units and the like on the spacecraft 77 can be employed for moving the object 78 in space.

It will also be apparent that booms of varying curvature such as the scorpion tail boom described can be employed in an antenna as hereinabove described or in many other applications. It will also be apparent that instead of a spiral, the boom can follow a parabolic or other curved path and find ready application in an antenna. A circularly curved boom as described in relation to FIG. 4 is preferred for ease of manufacturing since most of the links are identical.

A boom having a non-circular curvature such as a spiral is designed in the following manner: The curved path desired for one side of the boom such as, for example, the convex side, is arbitrarily selected as a spiral, for example, as illustrated in FIG. 17 by the curved line AB. As illustrated in FIG. 17 the curved line AB defines the convex side of the boom; however, the same general technique is employed when a line AB defines the concave side of the boom. The depth of the inner or first bay of the boom is selected with the desired structural characteristics of the boom in mind. This depth is defined by the distance AC with the points A and C preferably lying on a line normal to the tangent to the curve AB at the point A. Another point D is arbitrarily selected on the curve AB to define the length of the first bay. It is preferred that the distance AC be approximately the same as the distance AD for maximum structural strength. It will be apparent that other values can be employed in other structural arrangements.

A point E is then arbitrarily selected on a line DE that is normal to the tangent to the curve AB at the point D. The distance DE is preferably less than the distance AC so that the bays of the boom are of decreasing size towards the outer end of the boom. The links of the first bay of the boom interconnect the points A and E and the points C and D, intersecting at point F.

A second bay is laid out on the boom by arbitrarily selecting a point G on the curve AB. It is preferred that the distance DG be approximately the same as the distance DE at the inner end of the second bay for maximum structural strength. This latter preference applies when the boom is constructed from a curve defining the convex side thereof. When the curve AB defines the concave side of the boom it is preferred that the length of each bay along the curve AB be slightly less than the depth of the preceding bay transverse to the curve AB. Other values can be selected as desired to meet particular design criteria. The point H defining the intersection of the two links of the second bay is next determined such that the sum of the lengths DF and FE in the first bay is equal to the sum of the lengths DH and HE in the second bay. So long as these two sums are equal the curved boom can be retracted or extended as hereinabove described and forms a flat bundle on retraction as illustrated in FIG. 16.

The point H is relatively easily located when it is noted that the points D and E at the intersection of the two bays are foci of an ellipse passing through the point F and that the point H also lies on the same ellipse, the point H is then the intersection between the ellipse and the line EG. The other link of the second bay can then be constructed through points D and H and ending at point I which lies on a line GI normal to the tangent to the curve at the point G.

In a similar manner the next bay of the boom is laid out with an arbitrarily selected point J such that the distance GJ is approximately equal to the distance GI. The point K on the line IJ is then found as the intersection between an ellipse having foci G and I and lying through the point H, and the line IJ. This assures that the sum of the lengths GH and HI is equal to the sum of the lengths GK and KI thereby assuring that folding of the boom can be obtained.

Additional bays of the boom are designed in the same manner and as can be seen from FIG. 17 the successive bays are of successively lesser depth. Such a design technique can be rigorously employed, however, it is preferred to employ a graphical technique for original laying out of the boom. Such a technique may require a few iterations in order to make the progression of decreasing bay depths correspond to some desired criteria and to make the length of the boom exactly as desired. After such a boom is graphically designed the structural characteristics can be considered and if desired, modifications can be made to accommodate the loads, bending moments, and the like that may be encountered in the boom actually built. If desired, after graphical design, the exact dimensions of the elements of the boom can be mathematically determined for ease of manufacture.

In constructing a scorpion tail boom it is preferred to make the links thereof and interconnect them at their ends to form the boom in a retracted condition. After such assembly the pivot points between the links intermediate the ends thereof are formed and it is thereby assured that the boom will extend and retract as desired. It is found that if a boom is constructed with the pivot points of the links fabricated when the boom is extended that minor manufacturing tolerances are magnified on retraction and difficulty may be encountered in retracting the boom to the flat condition illustrated in FIG. 16.

It should also be noted that other non-linear booms can be constructed according to the principles of this invention. Thus the curvature can be in one direction on one portion of the boom and then go through an inflection and be in the opposite direction further along the boom. Similarly the depth of the boom can vary along the length in other manners than as specifically described. It will also be apparent that the scorpion tail boom or other non-linear booms can be formed of quadrilateral links as hereinabove illustrated.

In an embodiment of extensible structure as illustrated in FIG. 19 substantial lateral rigidity is provided in a scissors boom by means of tension cables. Such a scissors boom can be either a linearly extending boom or may be a nonlinear boom having circular extension as illustrated in FIG. 4, or may be a nonlinear boom having a spiral extension as hereinabove illustrated in FIG. 15. As illustrated in FIG. 19 three bays of such a boom are shown in linear extension for relative simplicity. It will be appreciated that the principles are identical for a nonlinear boom. As illustrated in FIG. 19 each bay 81 of the boom comprises a pair of quadrilateral links 82 and 83 pivotally interconnected at their midpoints by pivot bar 84. A quadrilateral link 82, for example, comprises four rigidly interconnected elements 82*a* 82*b*, 82*c*, and 82*d*. Similarly the other link 83 in the bay comprises four rigidly interconnected members 83*a*, 83*b*, 83*c*, and 83*d*. A first link 82 in each bay is connected to a second link 83 in an adjacent bay by a pivotal connection 86. In general, the bays and links illustrated in FIG. 19 are similar to those described and illustrated in relation to FIG. 6.

A zigzag cable 87 is provided running between the pivot points 86 between adjacent bays to provide extending forces for the scissor elements. The zigzag cable 87 and other cables hereinafter described in FIG. 19 are illustrated in the drawings merely as lines for purposes of convenience. A pair of cables 88 are provided interconnecting the pivot points 86 at the ends of the scissor links 82 and 83 at what may be considered the top and bottom of the boom. The cables 88 are preferably secured at each of the pivot points 86 or can slide loosely at these points as previously described and illustrated in relation to FIG. 4.

A pair of cables 89 are also provided along the length of the boom between the scissoring pivot points of successive bays at the ends of the pivot bars 84. A typical cable connection is illustrated in FIG. 20 wherein the cable 89 is secured to an end of the pivot bar 84 and the links 82 and 83 are free to pivot relative thereto. Tension in the zigzag cable 87 tends to extend the boom by opening of the scissors elements and this opening is restrained by the cables 88 and 89 which are thereby placed in tension.

A boom having links 82 and 83 in compression and cables 88 and 89 in tension due to the action of the zigzag cable 87 is a boom having substantial rigidity and resistance to bending. This resistance to bending in either of two directions transverse to the length of the boom is provided by the truss-like structure produced upon full extension of the boom.

As extended the boom comprises a series of tetragonal elements which strongly resist deformation. Thus the points M, N, O, and P in FIG. 19 define the points of a tetragonal figure, two sides of which are completely bounded by compression members 82, 83 and 84 respectively. A second tetragonal figure MNSR is formed on the opposite side and completely symmetrical with the tetragonal figure MNOP. The tetragonal figure MNSR is also bounded on two sides by compression members 82, 83 and 84. The compression members 82 in both of the aforementioned tetragonal figures are rigidly interconnected forming one of the quadrilateral links in the bay. Similarly, the compression members 83 are rigidly interconnected, forming the other quadrilateral link of the bay.

The manner in which the boom resists bending in a direction within the plane normal to the pivot axis of the scissor elements can be illustrated by the response to the force applied in the direction illustrated by the arrow 91 at the extreme right end of FIG. 19. This force may be considered to be reacted by fixing the points O and S at the left end of the boom illustrated in FIG. 19. The force acts on each of the bays in the boom in a similar manner and only differs in magnitude and analysis is given for the first bay 81. The force applied as illustratd by arrow 91 tends to open the scissor links; it is, however, resisted by the upper cable 88. This increases the tension in the upper cable 88 to a value greater than the no-load condition and concurrently increases the compressive load on the upper ends of the quadrilateral links 82 and 83.

Observing the tetragonal figure MNOP in FIG. 19 the sides NO, MO, MP, and NP are in compression and the side OP is in tension. No substantial bending moments occur on the tetragonal figure and no deformation thereof occurs.

A second pair of symmetrical tetragonal figures restricts bending in a direction normal to the direction hereinabove discussed. The points, P, N, R and Q define a tetragonal figure having four compression members, 82 and 83, and two tension members as defined by the cables 89 and 87, respectively. Symmetrical with this tetragonal figure is a tetragonal figure PMRT on the opposite side of the boom. If a force is applied to the boom as indicated by the arrow 92 at the extreme left end of FIG. 19 it is reacted by the tetragonal figures in a truss-like arrangement. In essence, the force 92 tends to bend the boom about a line running through the points P and R, since bending elsewhere on the boom is resisted by the depth of the rigid quadrilateral links 82 and 83 and bending, if at all, would occur at the joints 86. The cable 89 running along the side of the boom prevents the points M and T from spreading relative to each other and thereby prevents bending around the line PR.

In still another embodiment of extensible structure a boom having a generally triangular cross section is produced, as illustrated in FIGS. 21 to 23 which show such a boom in substantially retracted, partially extended, and completely extended positions, respectively. In essence, this boom comprises a plurality of scissor elements, four of which are illustrated in perspective in FIGS. 21 to 23. These scissor elements lie in a horizontal plane as illustrated in these figures and a series of triangular figures are provided in vertical planes running through the scissoring elements in the horizontal plane. Thus, as is probably seen most clearly in FIG. 22, there is provided a first triangular scissor link 95 in each bay comprising a bar 95*a* in a horizontal plane and two bars 95*b* in a vertical plane. A second triangular link 96 having a bar 96*a* in a horizontal plane and two bars 96*b* in a vertical plane is also provided in each bay. Bars 95*a* and 96*a* are pivotally interconnected at their midpoints for scissoring in the horizontal plane. The apexes of the triangles where the bars 95*b* and 96*b* meet are also pivotally interconnected as illustrated in greater detail in FIG. 24. Thus the two triangular scissor links 95 and 96 can pivot relative to each other about a vertical axis.

In order to provide rigidity in an extensible boom a vertical bar 97 is provided between the pivot point at the midpoints of the bars 95*a* and 96*a*, and the apexes of the triangular links where the bars 95*b* and 96*b* intersect. Both of the links 95 and 96 may be pivotable relative to the vertical bar 97.

Also provided in the horizontal plane wherein the bars 95*a* and 96*a* lie, are locking bars 98 which extend along the length of the boom when it is fully extended as illustrated in FIG. 23 and are nearly normal to the length of the boom when it is retracted as shown in FIG. 21. The locking bars are pivotally connected to the scissoring links 95 and 96 as illustrated in greater detail in FIG. 25 for pivoting in the horizontal plane. A pair of such locking bars are provided at each side of each bay in the boom with the ends of the bars pivotally interconnected. The locking bars are provided with a conventional locking toggle type over-center latching arrangement 102 at their interconnection so that once extended, the boom cannot be automatically retracted. The locking bars then are capable of carrying an appreciable compressive force as well as a tension force.

A typical latching arrangement 102 is illustrated in FIG. 31 wherein two locking bars 98*a* and 98*b* are pivoted together by a pin 103. A tang 104 is provided on the side of one of the locking bars 98*a* so that the other bar 98b strikes against the tang when the bars are fully unfolded. The tang 104 is placed so that the bars 98a and 98b are a very few degrees beyond parallel so that effective locking is obtained. Other means of rigidifying the locking bars for carrying a compressive load can readily be provided by one skilled in the art, such as, for example, a spring loaded sleeve over the pivot point or a ratchet and pawl arrangement at the pivot. When the boom is retracted the locking bars 98 are acutely bent at their interconnection for compact packing in the horizontal plane and when fully extended the locking bars 98 are substantially end to end in linear array along the length of the boom as illustrated in FIGS. 21 and 23, respectively.

At each apex of the links 95 and 96 there is attached a pivot bar 99 by a clevis 100 (FIG. 24) so that the pivot bar 99 can pivot in a vertical plane lying along the length of the boom. Each of the pivot bars 99 is the length of one bay in the boom when the boom is fully extended and is pivoted at its midpoint at the apex of the triangular links. The ends of the bars 99 are interconnected (FIGS. 21 to 23) so as to be acutely angulated relative to each other in a zigzag pattern when the boom is retracted and to extend along the length of the boom in a substantially straight direction when the boom is fully extended as illustrated in FIGS. 21 and 23, respectively. The pivot bars 99 may also have an over-center latch at their interconnection to permit application of compressive loads.

A zigzag cable 101 is provided on the boom so as to slide or pass over pulleys at various pivot points in the boom. The zigzag cable provides an opening force for the extensible boom in substantially the same manner as hereinabove described in relation to FIG. 4. In a typical arrangement the zigzag cable 101 (as viewed from the left end of FIG. 22) runs along one of the locking bars 98 to the intersection between two such locking bars in the middle of the first bay of the boom. The cable then passes to the scissoring pivot point between the links 95a and 96a in the horizontal plane. The cable then passes in a vertical plane which lies along the length of the boom to the interconnection between two pivot bars 99 and back to the pivoting interconnection between links 95a and 96a in the second bay. The cable 101 then passes from the aforementioned pivot point to the interconnection between two locking bars 98 in the second bay and thence along one of the locking bars in the second bay and a corresponding locking bar in the third bay and thereafter repeats a substantially similar pattern along the length of the boom. It will be apparent that other zigzag patterns can be employed for causing extension of the boom.

A tension on the zigzag cable 101 tends to extend the boom by drawing the locking bars towards a straight position thereby acting on the scissor elements at the intersection between two links 95 and 96 in the first bay (for example) and also in substantially a similar manner by acting on the pivot bars 99 tending to open the first and second bays from each other (for example). By running the zigzag cable in both the horizontal and vertical planes in the extensible boom the capability of the boom to accept bending loads in either direction is enhanced.

By providing over-center latches on the locking bars and pivot bars the boom can carry compression loads after full extension and more readily accommodate bending loads.

It will be appreciated that whereas horizontal and vertical have been employed to designate certain elements of the boom that these are merely for convenience in description and that the boom provided can assume any orientation.

FIGS. 26 to 28 illustrate another embodiment of extensible structure constructed according to the principles of this invention. FIG. 26 illustrates in perspective two bays of such a boom in a retracted position and FIG. 27 illustrates five bays of such a boom in an extended position. FIG. 28 comprises an end view of such a boom. As illustrated in these figures there is provided a series of cylindrical pivot blocks 105 axially located along the length of the boom. Each of the pivot blocks 105 has three bars 106 pivotally connected thereto at pivot points 107 at the midpoints of the respective bars to form a single bay of the boom. The bars 106 are connected to the pivot blocks at 120° intervals around the periphery thereof in a plane transverse to the axis of the boom. It will be apparent from FIG. 28 that the bars 106 can be either pivoted towards a plane containing the pivot points 107 or can be pivoted so as to be normal to a plane containing the pivot points, that is, along the length of the boom. The bars 106 cannot reach the plane containing the pivot points 107 because of the mutual interference therebetween but can approach that plane relatively closely, substantially shown in FIG. 26.

Successive bays of the extensible structure are interconnected by pivotal connections 110 at the ends of the bars 106. Thus, looking at two bays, bars XV and X'V in adjacent bays are interconnected at a point V by a pivot connection 110 having an axis parallel to the pivot connection 107 connecting the bars XV (or X'V) with the corresponding pivot block 105. Similarly, the bars ZU and Z'U are interconnected at the point U by a pivotal connection having an axis parallel to the axis of the pivot connection 107 at the midpoint of bar ZU.

As was mentioned hereinabove the bars 106 can pivot relative to the pivot block 105 to a position parallel to the axis thereof. In general, this is not desirable since the bending resistance of a boom is related to its cross-section and as illustrated in this embodiment, the resultant cross-section would be excessively narrow. It will be appreciated that by enlarging the diameter of the pivot block 105 that a boom could be made with adequate bending rigidity wherein the bars 106 are pivoted so as to be parallel to the axis of the extended boom. In the illustrated embodiment, however, the extent of pivoting of the bars 106 is limited by a plurality of cables 108 extending along the length of the boom and interconnecting the ends of corresponding bars. Thus, as illustrated in FIG. 27, cables 108 interconnect the points Y, Y' and also the points X, X' and Z, Z' to limit extension of the boom by limiting pivoting of the bars 106.

A zigzag cable 109 is provided for extending the boom having three scissoring links. As illustrated herein, the zigzag cable 109 lies along the link YW and then passes in a triangular pattern to the three pivot joints 110 at the ends of the links 106. Thus the cable passes from point W to point V, thence to point U, and returns to point W. The cable 109 then passes along the bar WY' and from the point Y' to X', Z' and back to Y'. The cable then passes along a pivot bar 106 from Y' to W' which is parallel to the bar between Y and W. The cable proceeds in like manner along the length of the boom for providing an extending force. In order to extend the boom, the cable 109 is retracted, thereby drawing the points X, Y, and Z and the points U, V, and W closer together. This urges the bars 106 to pivot toward a position parallel to the length of the boom. The extent of pivoting is limited by the cables 108 along the boom and the tension in the zigzag cable 109 provides a pretension in the longitudinal cables 108 for rigidifying the boom.

What is claimed is:

1. An extensible structure having a plurality of structural bays, a group of said bays comprising:

first and second crossed links pivotably connected at their intersection in a scissors-like arrangement, the ends of links in adjacent bays being pivotably interconnected; said extensible structure further comprising:

a zigzag cable along the length of the structure, alternately running along one of said links in a bay and between pairs of pivotal interconnections of adjacent bays for urging pairs of pivotal interconnections together;

tension means extending between pivotal interconnections of successive bays for limiting extension of the extensible structure; and wherein;

said links each comprise a diamond-like quadrilateral frame having a plane of symmetry through the pivotable connections between links in adjacent bays, and pivotably connected to the other diamond-like quadrilateral link in its respective bay at the obtuse apexes thereof and pivotably interconnected with a link in an adjacent bay at an acute apex thereof for forming a substantially diamond like transverse cross-section of said extensible structure, said transverse cross-section of the extensible structure having a plane of symmetry defined by the collective planes of symmetry of each of said links.

2. An extensible structure having a plurality of structural bays, a group of said bays comprising:

first and second crossed links pivotably connected at their intersection in a scissors-like arrangement, the ends of links in adjacent bays being pivotably interconnected; said extensible structure further comprising:

a zigzag cable along the length of the structure alternately running along one of said links in a bay and between pairs of pivotable interconnections of adjacent bays for urging pairs of pivotable interconnections together;

tension means extending between pivotable interconnections of successive bays for limiting extension of the extensible structure;

second tension means extending between the pivotal connection of the two links in one bay and the pivotal connection of the two links of an adjacent bay for adding bending stiffness to the extensible structure; and wherein;

said links each comprise a diamond-like quadrilateral frame pivotably connected to the other diamond-like quadrilateral frame in its respective bay at the obtuse apexes thereof and pivotably interconnected with a link in an adjacent bay at an acute apex thereof for forming a substantially diamond-like transverse cross-section of said extensible structure.

3. An extensible structure having a plurality of structural bays, a group of said bays comprising:

first and second crossed links pivotably connected at their intersection in a scissors-like arrangement, the ends of links in adjacent bays being pivotably interconnected; said extensible structure further comprising:

a zigzag cable along the length of the structure, alternately running along one of said links in a bay and between pairs of pivotal interconnections of adjacent bays for urging pairs of pivotal interconnections together;

tension means extending between pivotal interconnections of successive bays for limiting extension of the extensible structure;

wherein the length of the two links in a bay between the intersection and the ends are unequal so that the extensible structure extends in a nonlinear direction; and wherein the consecutive ends of bays along the extensible structure are mutually angulated so that the extensible structure extends in a non-circular curved path.

4. An extensible structure as defined in claim 3 wherein the consecutive ends of bays along the extensible structure have a progressive difference in depth so that the extensible structure extends in a spiral path.

5. An extensible structure having a plurality of structural bays, a group of said bays comprising:

first and second crossed links pivotably connected at their intersection in a scissors-like arrangement, the ends of links in adjacent bays being pivotably interconnected; said extensible structure further comprising:

a zigzag cable along the length of the structure, alternately running along one of said links in a bay and between pairs of pivotal interconnections of adjacent bays for urging pairs of pivotal interconnections together;

tension means extending between pivotal interconnections of successive bays for limiting extension of the extensible structure; and wherein each bay further comprises:

a third link crossed with said first and second links and pivotably connected thereto, the pivot axes of the three links being spaced at about 120° in a plane normal to the axis of the extensible structure.

6. An extensible structure comprising:

a plurality of structural bays, each of said bays comprising a pair of crossed links pivotably connected at their intersection, the ends of links in adjacent bays being pivotably interconnected, the lengths of the two links in some of the bays between the crossing and the ends being unequal;

means for moving the extensible structure between a retracted and an extended position by pivoting about the pivotable interconnections, whereby the extensible structure extends in a non-linear direction; and wherein the consecutive ends of bays along the extinsible structure are mutually angulated so that the extensible structure extends in a non-circular curved path.

7. An extensible structure comprising:

a plurality of structural bays, each of said bays comprising a pair of crossed links pivotably connected at their intersection, the ends of links in adjacent bays being pivotably interconnected, the lengths of the two links in some of the bays between the crossing and the ends being unequal;

means for moving the extensible structure between a retracted and an extended position by pivoting about the pivotable interconnections, whereby the extensible structure extends in a non-linear direction; and wherein the consecutive ends of bays along the extensible structure have a progressive difference in depth so that the extensible structure extends in a spiral path.

8. An extensible structure comprising:

a hub;

a plurality of extensible structures each comprising:

a plurality of structural bays, each of said bays comprising a pair of crossed links pivotably connected at their intersection, the ends of links in adjacent bays being pivotably interconnected, the lengths of the two links in some of the bays between the crossing and the ends being unequal; and means for moving the extensible structure between a retracted and and extended position by pivoting about the pivotable interconnections, whereby the extensible structure extends in a non-linear direction; said extensible structures forming booms radiating from said hub in the manner of spokes for forming a dish-like structure when extended; and intercostal tension means extending between adjacent booms for minimizing lateral deflection of said booms and for applying compression loading on said booms.

9. An extensible structure as defined in claim 8 further comprising first tension means on the concave side of this dish-like structure for urging said structure away from a plane; and wherein each of said booms further comprises:

second tension means between the pivotal interconnections of the ends of links in adjacent bays along the convex side of the boom for urging the boom toward a plane.

10. An extensible structure as defined in claim 9 wherein said means for moving the extensible structure comprises:

a zigzag cable extending along each of said booms, each of said zigzag cables alternately running along one of said crossed links and between pivotal interconnections of ends of links in adjacent bays for urging pairs of the pivotal interconnections together and thereby urging each of said booms toward an extended position.

11. An extensible structure as defined in claim 10 further comprising:

an extensible column on said hub and extending in a direction substantially normal to said booms; and wherein at least a portion of said first tension means extend between said column and an outer portion of each of said booms for stabilizing said column.

12. An extensible reflector comprising an extensible structure as defined in claim 10 and further comprising:

a dish-like flexible reflective membrane on the concave side of the dish-like structure for reflecting radiation.

13. An extensible antenna comprising a reflector as defined in claim 12 wherein said membrane is electrically conductive for reflecting signals and further comprising:

an extensible column on said hub and extending in a direction substantially normal to said booms; and an antenna feed on said column for transmitting signals to or from said membrane.

14. An extensible antenna as defined in claim 13 further comprising:

a cable extending between adjacent booms near the outer ends thereof and connected to the periphery of said membrane for applying a tension to said membrane when said antenna is extended; and a plurality of faceting cables arrayed on the concave side of said membrane, said faceting cables being intermittently connected to said booms and said intercostal tension means through said membrane for holding said membrane at a preselected spacing from said dish-like structure when said antenna is extended.

15. A method of extending a curved extensible structure to a preselected curved configuration comprising:

extending the structure to a first curved configuration;

applying a first tension intermittently along the length of the extensible structure on the convex side thereof for urging the structure toward a straight configuration; and reacting the first tension with a second tension along the length of the extensible structure on the concave side of the structure for limiting straightening of the structure to a second curved configuration.

16. A reflector comprising:

a centrally supported dish-like structural framework free of peripheral support;

a thin, light weight, dish-like reflector membrane on the concave side of the structural framework;

means for maintaining biaxial tension in said reflector including faceting means for forming a plurality of facets in said reflector;

a plurality of tension means for connecting said faceting means to the structural framework at a plurality of points whereby a plurality of small loads are transmitted to said structural framework at a plurality of points for minimizing structural weight thereof.

17. A reflector comprising:

a dish-like structural framework comprising:

a hub;

a plurality of compression booms extending radially from said hub in a manner of spokes;

each of said booms being curved to form a dish-like structure;

second tension means connected to said booms for urging said booms outwardly from said hub; and a plurality of tension intercostals extending between adjacent ones of said booms for forming a rigid structural framework; said reflector further comprising:

a thin, light weight, dish-like reflector membrane on the concave side of the structural framework;

means for maintaining biaxial tension in said reflector including faceting means for forming a plurality of facets in said reflector;

a plurality of tension means for connecting said faceting means to the structural framework at a plurality of points whereby a plurality of small loads are transmitted to said structural framework at a plurality of points for minimizing structural weight thereof.

18. A reflector as defined in claim 17 wherein said second tension means comprises a zigzag cable alternately connected to the convex and concave sides of the boom.

19. A reflector as defined in claim 17 wherein said compression booms are foldable and said tension means comprise cables; and further comprising:

means for folding said booms between retracted and extended positions whereby said antenna is retracted for transport and extended for use.

20. An antenna comprising:

a dish like structural framework in the form of a segment of a sphere;

a thin, light weight dish-like reflector membrane in the form of a segment of a parabaloid on the concave side of the structural framework;

means for maintaining biaxial tension in said reflector including faceting means for forming a plurality of facets in said reflector;

a plurality of tension means for connecting said faceting means to the structural framework at a plurality of points whereby a plurality of small loads are transmitted to said structural framework at a plurality of points for minimizing structural weight thereof.

21. A reflector comprising:

a dish-like structural framework;

a thin, light weight, dish-like reflector membrane on the concave side of the structural framework;

means for maintaining biaxial tension in said reflector including faceting means for forming a plurality of facets in said reflector;

a plurality of tension means for connecting said faceting means to the structural framework at a plurality of points whereby a plurality of small loads are transmitted to said structural framework at a plurality of points for minimizing structural weight thereof; and wherein said means for maintaining biaxial tension including faceting means comprises:

a cable substantially continuously connected to the periphery of said reflector membrane and intermittently connected to said structural framework for applying a peripheral tension to the reflector membrane whereby the reflector membrane is urged toward a plane; and a network of faceting cables contacting said reflector membrane and intermittently connected to said structural framework by said tension means whereby the reflector membrane is urged away from a plane and biaxial tension is maintained substantially throughout the dish-like reflector membrane.

22. An antenna comprising a structure as defined in claim 11 wherein said dish-like structural framework is substantially hexagonal and comprises:

a hub;

six booms uniformly spaced about said hub as radial compression members;

each of said booms comprising a curved lazy tongs type extensible structure having a plurality of bays wherein each of said bays comprises a pair of scissoring links, and each of said bays is connected to an adjacent bay by a pair of pivotal interconnections between corresponding links in the two bays; and wherein each of said pairs of pivotal interconnections defines a line that runs through a point common to all of such lines on each of said booms at any retracted or extended position of the boom so that the booms are cooperatively extensible along paths lying on a sphere to define at least a portion of said dish-like structural framework;

each of said booms further comprising a first cable connected to the pivotal interconnections on the concave side of the boom, a second cable connected to the pivotal interconnections on the convex side of the boom said first and second cables limiting extension of said boom, and a zigzag cable extending along the length of the boom in a path alternately along a link in each bay and between the pairs of pivotal interconnections between adjacent bays for urging pairs of pivotal interconnections together and thereby urging said booms toward an extended position; and wherein each of said links in the booms comprise a diamond-like quadrilateral frame pivotably connected to the other diamond-like quadrilateral link in its respective bay at the obtuse apexes thereof and pivotably interconnected with another link in an adjacent bay at an acute apex thereof;

a plurality of cable intercostals interconnecting adjacent booms for applying loads thereto and inhibiting lateral buckling thereof;

each of said intercostals comprising a first cable secured between adjacent booms on the concave side thereof, a second cable secured between adjacent booms on the convex side thereof, and a plurality of truss cables between said first and second cables for spacing said cables apart a greater distance adjacent said booms and a lesser distance remote from said booms; and said antenna further comprises:

means for retracting said zigzag cable for extending said booms; and an antenna feed on the concave side of the reflector.

23. An antenna as defined in claim 22 wherein said means for maintaining biaxial tension in said reflector including faceting means comprises:

a cable substantially continuously connected to the periphery of said reflector and connected to each of said booms near the outer end thereof for applying a peripheral tension to the reflector whereby the reflector is urged toward a plane;

a network of faceting cables contacting said reflector for forming a matrix of plane facets of substantially equilateral triangular shape with each of said faceting cables connected to said structural framework at the apexes of the triangles by said tension means whereby the reflector is urged toward the spherical structural framework and biaxial tension is maintained substantially throughout the dish-like reflector; and wherein said tension means comprises a plurality of drop cables extending between said faceting cables and said structural framework, said drop cables being of differing lengths so that said reflector surface defines substantially a paraboloid; and said antenna feed comprises an extensible support column, a feed horn, and a plurality of cables extending between said column and said booms.

24. A lazy tongs extensible structure having substantial compressive strength and buckling resistance comprising:

a plurality of structural bays, a group of said bays comprising at least a pair of crossed links pivotably connected at their intersection, the ends of links in adjacent bays being pivotably interconnected, the extremities of said links defining a substantially diamond shaped transverse cross-section of the extensible structure;

a zigzag cable extending along the length of the structure and intermittently transverse to the bays for urging the bays toward an extended position;

a plurality of tension means extending along the length of the structure interconnecting each of the corresponding extremities of the diamond-shaped cross-section in adjacent bays for forming a truss-like structure; and means for preventing scissoring of said links toward a retracted position; and wherein each of said links comprises a substantially diamond-like, quadrilateral frame having a plane of symmetry through the pivotable connections between links in adjacent bays and pivotably connected to the other diamond-like quadrilateral link in its respective bay at a pair of opposite extremities thereof and pivotably interconnected with a link in an adjacent bay at another extremity thereof, for forming a truss-like structure with a substantially diamond shaped cross-section; said transverse cross-section of the truss-like structure having a plane of symmetry defined by the collective planes of symmetry of each of said links.

25. A lazy tongs type extensible structure having substantial compressive strength and buckling resistance comprising:

a plurality of structural bays, a group of said bays comprising at least a pair of crossed links pivotably connected at their intersection, the ends of links in adjacent bays being pivotably interconnected, the extremities of said links defining a polygonal transverse cross-section of the extensible structure;

a zigzag cable extending along the length of the structure and intermittently transverse to the bays for urging the bays toward an extended position;

a plurality of tension means extending along the length of the structure interconnecting each of the corresponding extremities of the polygonal cross-section in adjacent bays for forming a truss like structure; and means for preventing sicssoring of said links toward a retracted position; and wherein each of said links comprises a triangular frame pivotably connected to the other triangular link in its respective bay at the midpoint of one side of the triangle and at the opposite extremity thereof and pivotably interconnected with a link in an adjacent bay at another extremity thereof, for forming a truss-like structure with a substantially triangular transverse cross-section.

26. A lazy tongs type extensible structure having substantial compressive strength and buckling resistance, comprising:

a plurality of structural bays, a group of said bays comprising first and second crossed links pivotably connecting at their intersection, the ends of links in adjacent bays being pivotably interconnected, the extremities of said links defining a polygonal cross-section of the extensible structure;

a third link crossed with said first and second links and pivotably connected thereto, the pivot axes of the three links being spaced at about 120° in a plane normal to the axis to the extensible structure;

a zigzag cable extending along the length of the structure and intermittently transverse to the bays for urging the bays toward an extended position;

a plurality of tension means extending along the length of the structure interconnecting corresponding extremities of links in adjacent bays for forming a truss-like structure; and means for preventing scissoring of said links toward a retracted position.

References Cited

UNITED STATES PATENTS

| | | | |
|---|---|---|---|
| 797,077 | 8/1905 | Shaw | 182—141 |
| 1,708,113 | 4/1929 | Allen | 52—109 |
| 2,071,093 | 2/1937 | Van Horn | 108—4 |
| 2,767,812 | 10/1956 | Boyer | 52—109 |
| 3,053,351 | 9/1962 | Fulcher | 52—109 |
| 3,152,347 | 10/1964 | Williams | 52—109 |
| 3,174,397 | 3/1965 | Sanborn | 343—915 X |
| 3,224,007 | 12/1965 | Mathis | 343—915 |
| 3,261,016 | 7/1966 | Burr | 343—915 X |
| 3,286,270 | 11/1966 | Kelly | 343—915 |
| 3,360,798 | 12/1967 | Webb | 343—915 |
| 3,375,624 | 4/1968 | Mikulin | 52—109 |

FOREIGN PATENTS

| | | |
|---|---|---|
| 800,658 | 7/1936 | France. |
| 835,050 | 6/1956 | Germany. |

FRANK L. ABBOTT, Primary Examiner

PRICE C. FAW, JR., Assistant Examiner

U.S. Cl. X.R.

52—80, 222, 632, 646; 294—71, 86; 343—915